US012304761B2

(12) United States Patent
Yoshioka et al.

(10) Patent No.: US 12,304,761 B2
(45) Date of Patent: May 20, 2025

(54) MOUNTING MEMBER, CYLINDER MEMBER, AND IMAGE FORMING APPARATUS

(71) Applicant: FUJIFILM Business Innovation Corp., Tokyo (JP)

(72) Inventors: Tomoaki Yoshioka, Kanagawa (JP); Satoshi Shigezaki, Kanagawa (JP); Tomohiro Wada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 280 days.

(21) Appl. No.: 17/964,044

(22) Filed: Oct. 12, 2022

(65) Prior Publication Data

US 2023/0123692 A1 Apr. 20, 2023

(30) Foreign Application Priority Data

Oct. 15, 2021 (JP) ................................. 2021-169896

(51) Int. Cl.

| | |
|---|---|
| ***B65H 29/04*** | (2006.01) |
| ***B65H 29/06*** | (2006.01) |
| ***G03G 15/00*** | (2006.01) |
| ***G03G 15/16*** | (2006.01) |
| *B65H 11/00* | (2006.01) |

(52) U.S. Cl.

CPC ........... *B65H 29/044* (2013.01); *B65H 29/06* (2013.01); *G03G 15/1615* (2013.01); *G03G 15/6529* (2013.01); *G03G 15/6555* (2013.01); *G03G 15/657* (2013.01); *B65H 11/002* (2013.01); *B65H 29/045* (2013.01); *B65H 2301/44338* (2013.01); *B65H 2301/5111* (2013.01); *B65H 2404/34* (2013.01); *B65H 2404/341* (2013.01); *B65H 2404/521* (2013.01); *B65H 2405/5521* (2013.01); *B65H 2405/582* (2013.01); *B65H 2801/03* (2013.01); *B65H 2801/06* (2013.01); *G03G 2215/00409* (2013.01); *G03G 2215/00679* (2013.01)

(58) Field of Classification Search

CPC ..... G03G 15/1685; G03G 2215/00409; G03G 15/6555; G03G 2215/00679; B65H 2404/341; B65H 2404/521; B41F 30/02; B41F 30/04

See application file for complete search history.

(56) References Cited

U.S. PATENT DOCUMENTS

| | | | | |
|---|---|---|---|---|
| 3,750,571 A * | 8/1973 | Germann | ............ | B41F 27/1231 101/415.1 |
| 4,943,467 A * | 7/1990 | Shuji | ........................ | B41N 1/14 428/317.1 |
| 8,254,817 B2 | 8/2012 | Kamijo et al. | | |

FOREIGN PATENT DOCUMENTS

| | | |
|---|---|---|
| JP | 2004271804 | 9/2004 |
| JP | 2010217739 | 9/2010 |
| JP | 5278687 | 9/2013 |

* cited by examiner

*Primary Examiner* — Jeremy R Severson
(74) *Attorney, Agent, or Firm* — JCIPRNET

(57) ABSTRACT

A mounting member to be mounted on a member that moves in a traveling direction includes: a rectangular sheet member; and an attachment portion having a first surface bonded to one end portion of a reverse surface of a downstream side portion of the sheet member in the traveling direction, the attachment portion being detachably attached to an attachment-receiving portion and having a surface facing a direction different from a direction of the first surface and bonded to the sheet member.

11 Claims, 16 Drawing Sheets

MOUNTING MEMBER, CYLINDER MEMBER, AND IMAGE FORMING APPARATUS

CROSS-REFERENCE TO RELATED APPLICATIONS

This application is based on and claims priority under 35 USC 119 from Japanese Patent Application No. 2021-169896 filed Oct. 15, 2021.

BACKGROUND

(i) Technical Field

The present invention relates to a mounting member, a cylinder member, and an image forming apparatus.

(ii) Related Art

JP2004-271804A discloses an image forming apparatus including a latent image carrier, a latent image forming unit configured to form a latent image on a surface of the latent image carrier, a developing unit configured to develop the latent image on the latent image carrier into a toner image with a developer, an intermediate transfer body configured to transfer the toner image on the latent image carrier onto a surface of the intermediate transfer body moving in contact with the latent image carrier at a primary transfer position facing the latent image carrier, and a secondary transfer device configured to transfer the toner image on the intermediate transfer body onto a surface of a transfer material by transporting the transfer material to move in contact with the intermediate transfer body at a secondary transfer position facing the intermediate transfer body.

JP5278687B discloses a transfer device including a conductive elastic member configured to carry a transfer material, a transfer material peeling member configured to peel the transfer material from the elastic member, a conductive support member having an elastic member support portion configured to support the elastic member and a peeling member support portion configured to support the transfer material peeling member, a transfer bias application unit electrically connected to the support member and configured to apply a transfer bias, a conductive flange provided at an end portion of the support member, and a connecting portion configured to electrically connect the transfer bias application unit and the flange.

JP2010-217739A discloses a transfer device including an image carrier configured to carry an image, a cleaning unit configured to clean the image carrier by coming into contact with the image carrier, a first drive unit configured to drive the image carrier, a transfer roller having a cylindrical portion, a recess formed in the cylindrical portion in the axial direction, and a transfer material support portion that is fixed by the recess to support a transfer material, and a second drive unit configured to drive the transfer roller.

SUMMARY

Aspects of non-limiting embodiments of the present disclosure relate to a mounting member, a cylinder member, and an image forming apparatus in which a sheet member is less likely to peel off from an attachment portion than when only the first surface of the attachment portion is bonded to the sheet member.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a mounting member to be mounted on a member that moves in the traveling direction. The mounting member includes a rectangular sheet member and an attachment portion that has a first surface bonded to one end portion of the reverse surface of the downstream side portion of the sheet member in the traveling direction and is detachably attached to an attachment-receiving portion, with a surface facing a direction different from that of the first surface being bonded to the sheet member.

DETAILED DESCRIPTION

An embodiment of the present invention will be described in detail below with reference to the accompanying drawings. For convenience of description, in FIG. 1, a direction along an arrow H is referred to as an up-down direction of an image forming apparatus 10, a direction along an arrow W is referred to as a width direction of the image forming apparatus 10, and a direction along an arrow D is referred to as a front-rear direction of the image forming apparatus 10.

First Embodiment

Figure 1:
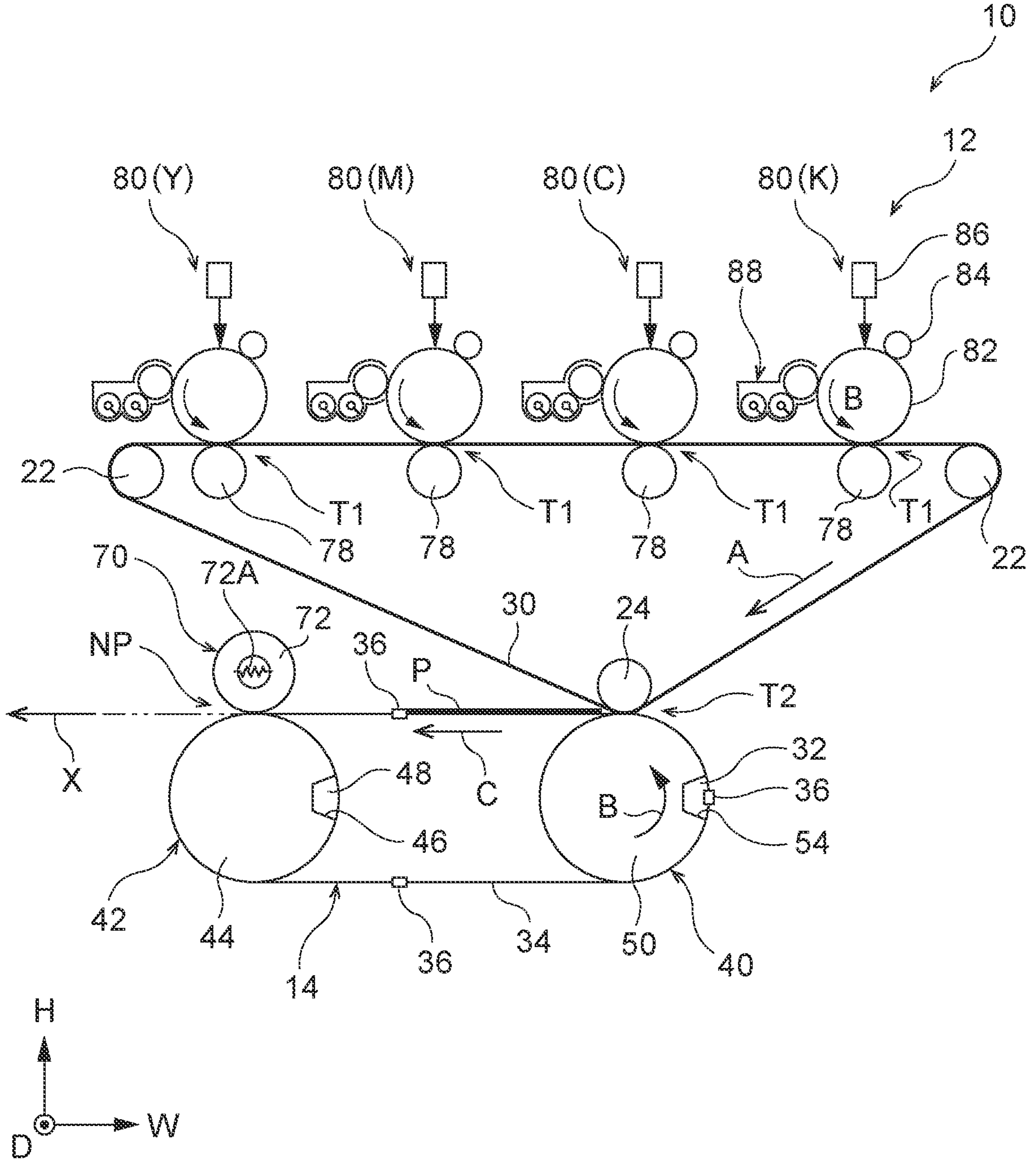
FIG. 1 is a schematic view illustrating an example of an image forming apparatus to which a mounting member according to the first embodiment is applied.

The image forming apparatus 10 to which a mounting member according to the first embodiment is applied will be described first. As illustrated in FIG. 1, the image forming apparatus 10 is, for example, an electrophotographic apparatus that forms an image on a recording medium P. The image forming apparatus 10 includes an image forming unit 12, a conveying unit 14, and a fixing device 70.

Hereinafter, the image forming unit 12, the conveying unit 14, and the fixing device 70 of the image forming apparatus 10 will be described, and then a transfer cylinder 50 as an example of a cylinder member will be described.

(Image Forming Unit)

As illustrated in FIG. 1, the image forming unit 12 has a function of forming a toner image (an example of an image) of each color on a recording medium P. More specifically, the image forming unit 12 includes a toner image forming unit 80 that forms a toner image (an example of an image) of each color, a transfer belt 30 as an example of an intermediate transfer body, a plurality of (two in the present embodiment) rollers 22, a counter roller 24 as an example of a transfer member, and a transfer body 40. The transfer belt 30 and the counter roller 24 are examples of other members.

The transfer belt 30 is an endless belt and is wound around the two rollers 22 and the counter roller 24 so as to have an inverted triangular shape when viewed in the front-rear direction. The transfer belt 30 circulates in the arrow A direction by at least one of the two rollers 22 being rotationally driven.

A plurality of toner image forming units 80 are provided to form toner images of respective colors. In the present embodiment, the toner image forming units 80 for four colors including yellow (Y), magenta (M), cyan (C), and black (K) are provided. Referring to FIG. 1, the alphabetic characters Y, M, C, and K are added after the reference numeral 80 so as to correspond to the respective colors.

Each of the toner image forming units 80 (80Y, 80M, 80C, and 80K) for the respective colors includes a cylindrical photoconductor 82 that rotates in one direction (the arrow B direction), and a charging device 84, an exposure device 86, and a developing device 88 are disposed around the photoconductor 82 in this order from the upstream side in the rotation direction of the photoconductor 82.

In each of the toner image forming units 80, the charging device 84 charges the surface of the photoconductor 82, and the exposure device 86 exposes the surface of the photoconductor 82 charged by the charging device 84 to light so as to form an electrostatic latent image on the surface of the photoconductor 82. The developing devices 88 develop the electrostatic latent images formed on the surfaces of the photoconductors 82 by the exposure devices 86, thereby forming toner images.

Primary transfer rollers 78 are provided on the inner peripheral surface side of the transfer belt 30 so as to face the photoconductors 82 with the transfer belt 30 interposed therebetween. The toner images formed by the toner image forming units 80 for the respective colors are sequentially primarily transferred to and superimposed on the transfer belt 30 at a primary transfer position T1 where the first transfer roller 78 is provided, and the superimposed toner images are secondarily transferred to the recording medium P at a secondary transfer position T2.

Figure 2:
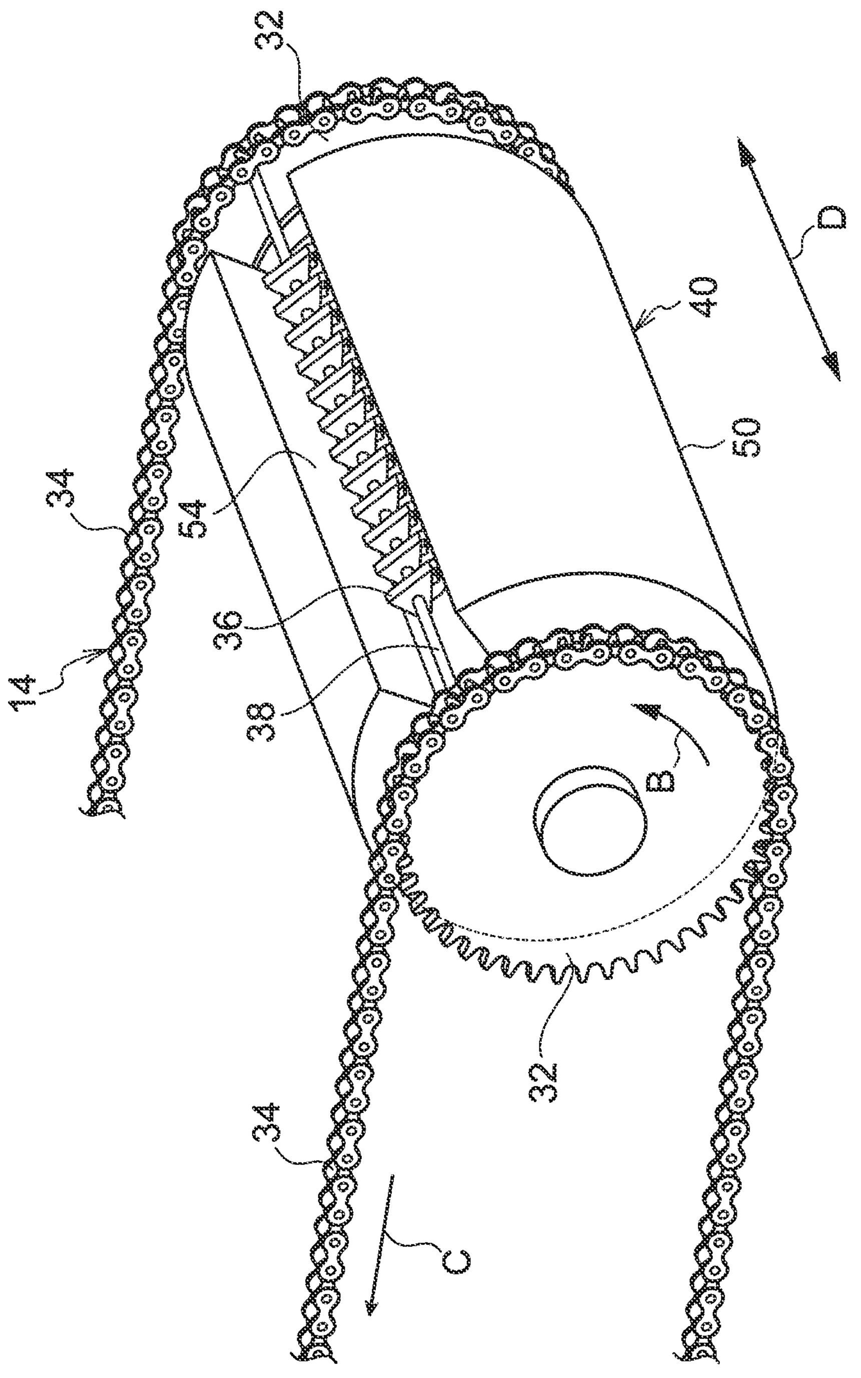
FIG. 2 is a perspective view illustrating the configuration of the transfer member of the image forming apparatus.

The transfer member 40 is disposed below the transfer belt 30. As illustrated in FIG. 2, the transfer body 40 includes the transfer cylinder 50 disposed such that the axial direction of the transfer body 40 coincides with the axial direction of the counter roller 24. The transfer cylinder 50 is disposed so as to face the transfer belt 30 and is configured such that a nip region where the transfer belt 30 is nipped between the transfer cylinder 50 and the counter roller 24 is located at the secondary transfer position T2. A secondary transfer voltage is applied between the counter roller 24 and the transfer cylinder 50 at the secondary transfer position T2, so that the toner images on the transfer belt 30 are transferred onto the recording medium P.

Referring to FIG. 1, the conveying direction of the recording medium P is indicated by an arrow X. A cleaner that removes toner remaining on the transfer belt 30 may be provided downstream of the secondary transfer position T2 in the belt rotating direction and upstream of the toner image forming unit 80 (80Y, 80M, 80C, or 80K) in the belt rotating direction.

As illustrated in FIG. 2, a recess 54 that accommodates a gripper 36 and a support member 38, which will be described later, is formed in a part of the outer peripheral surface of the transfer cylinder 50. A pair of sprockets 32 are provided at both axial ends of the transfer cylinder 50. The pair of sprockets 32 are disposed coaxially with the transfer cylinder 50 and rotates together with the transfer cylinder 50. The transfer cylinder 50 is rotationally driven by a drive unit (not illustrated). A chain 34 described later is wound around the pair of sprockets 32.

The counter roller 24 is movable between a contact position at which the counter roller 24 is in contact with the transfer cylinder 50 and a separation position at which the counter roller 24 is separated from the transfer cylinder 50 by a moving mechanism-for-transfer (not illustrated) using a cam or the like. More specifically, the counter roller 24 is constantly pressed or pulled toward the contact position by the elastic force of an elastic member such as a spring and is moved to the separation position against the elastic force by the moving mechanism-for-transfer.

(Fixing Device)

As illustrated in FIG. 1, the fixing device 70 fixes the toner images that have been transferred to the recording medium P to the recording medium P. More specifically, the fixing device 70 includes a pressurizing body 42 and a heating roller 72 that are disposed downstream of the conveying unit 14 in the conveying direction of the recording medium P.

Figure 3:
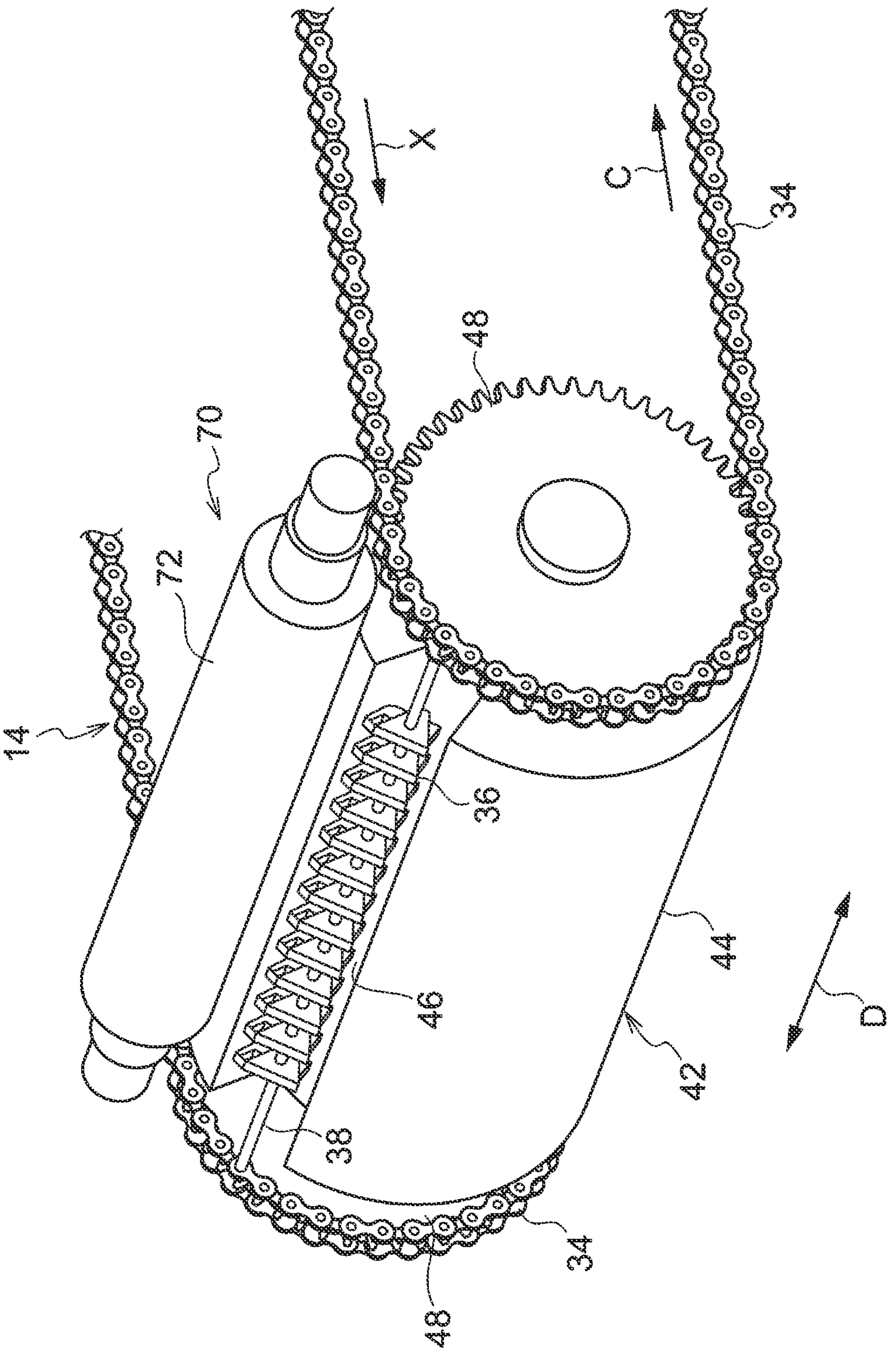
FIG. 3 is a perspective view illustrating the configuration of the fixing device of the image forming apparatus.

As illustrated in FIG. 3, the pressurizing body 42 includes a pressurizing roller 44 disposed so that the axial direction of the pressurizing body 42 coincides with the axial direction of the transfer cylinder 50, and a pair of sprockets 48 are provided at both axial ends of the pressurizing roller 44. The pair of sprockets 48 are disposed coaxially with the pressurizing roller 44, and rotates together with the pressurizing roller 44. The chain 34, which will be described later, is wound around the pair of sprockets 48.

As illustrated in FIG. 1, the heating roller 72 and the pressurizing roller 44 are arranged along the up-down direction. That is, the heating roller 72 is disposed above the pressurizing roller 44. The heating roller 72 includes therein a heating source 72A (see FIG. 1) such as a halogen lamp. Hereinafter, the position at which the recording medium P is nipped by the heating roller 72 and the pressurizing roller 44 is referred to as a nip position NP.

The heating roller 72 is movable by a moving mechanism-for-fixing (not illustrated) using a cam or the like, between a contact position at which the heating roller 72 is in contact with the pressurizing roller 44 and a separation position at which the heating roller 72 is separated from the pressurizing roller 44. More specifically, the heating roller 72 is constantly pressed or pulled toward the contact position by the elastic force of an elastic member, such as a spring, and is moved to the separated position against the elastic force by the fixing moving mechanism. At the contact position, the heating roller 72 and the pressurizing roller 44 nip the recording medium P therebetween.

Although the heating roller 72 is rotationally driven and the pressurizing roller 44 is driven and rotated in the present embodiment, both the heating roller 72 and the pressurizing roller 44 may be rotationally driven. A recess 46 is formed in a part of the outer peripheral surface of the pressurizing roller 44 so as to accommodate the gripper 36 and the support member 38, which will be described later.

(Conveying Unit)

As illustrated in FIGS. 1 to 3, the conveying unit 14 has a function of conveying the recording medium P to make it pass through the secondary transfer position T2 and the nip position NP. The conveying unit 14 includes a pair of chains 34 and a gripper 36. The pair of chains 34 are an example of a driving force transmission member, and the gripper 36 is an example of a holding member that holds the leading end of the recording medium P. In FIG. 1, the chain 34 and the gripper 36 are illustrated in a simplified manner.

As shown in FIG. 1, each of the pair of chains 34 is formed in an annular shape. As shown in FIGS. 2 and 3, the pair of chains 34 are disposed at an interval in the apparatus depth direction. That is, the pair of chains 34 are wound around the pair of sprockets 32 provided coaxially with the transfer cylinder 50 and the pair of sprockets 48 provided coaxially with the pressurizing roller 44.

When the transfer cylinder 50 is rotationally driven by a drive unit (not illustrated), the pair of sprockets 32 are rotationally driven in a rotation direction B (arrow B direction) as a single unit whereby the chains 34 circulate in a circulating direction C (arrow C direction). This drives and rotates the pressurizing roller 44. That is, the rotational driving force of the transfer cylinder 50 is transmitted to the pressurizing roller 44 by the pair of chains 34 that circulate in the circulating direction C (see FIG. 1).

As illustrated in FIGS. 2 and 3, a support member 38 to which the gripper 36 is attached is bridged between the pair of chains 34 in the apparatus depth direction. A plurality of (three in FIG. 1) support members 38 are provided, and each support member 38 is fixed to the pair of chains 34 at predetermined intervals along the circumferential direction of the chains 34 (circulating direction C).

A plurality of the grippers 36 are attached to the respective support members 38 in such a manner as to be arranged at a predetermined intervals along the apparatus depth direction. That is, the grippers 36 are attached to the chains 34 through the respective support members 38. Each gripper 36 has a function of holding the leading end of the recording medium P.

Figure 4:
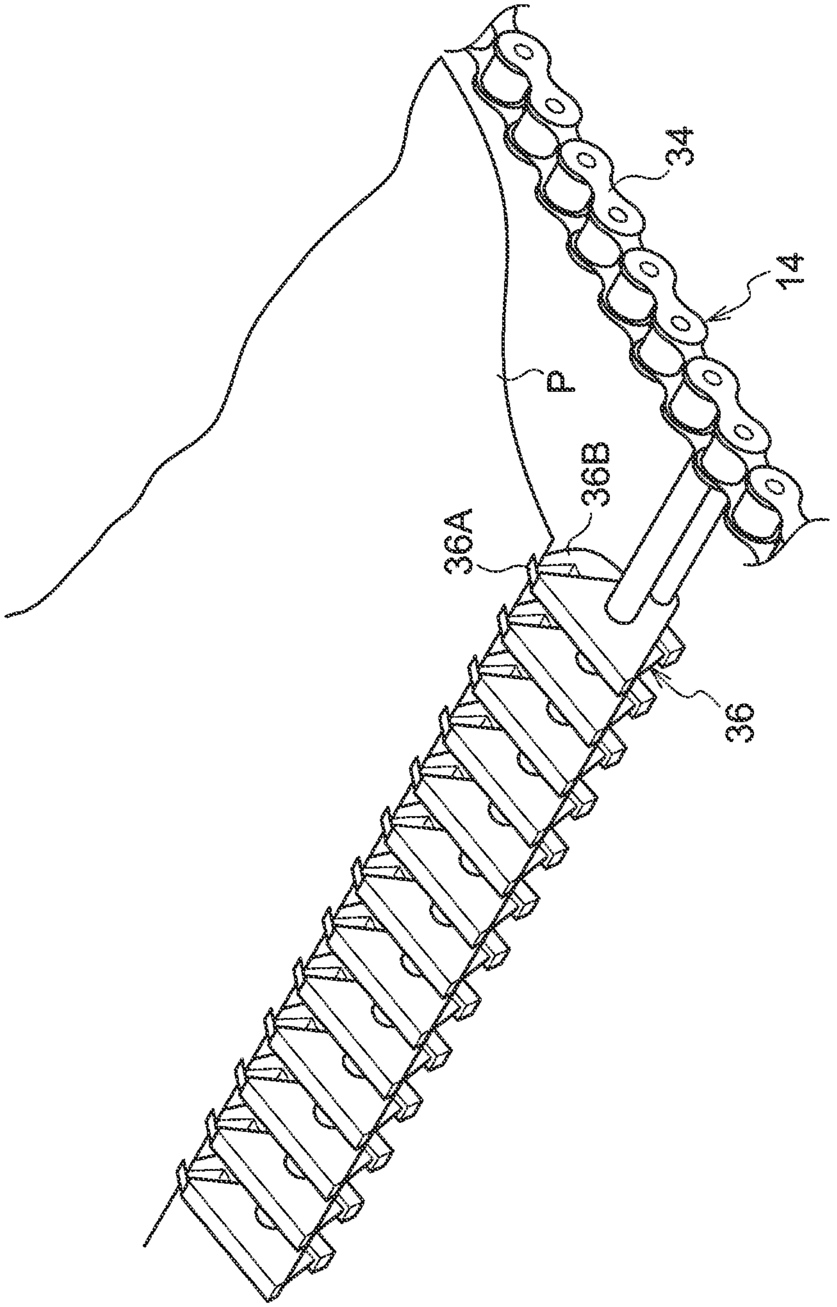
FIG. 4 is a perspective view illustrating the gripper of the image forming apparatus.

More specifically, as illustrated in FIG. 4, the gripper 36 includes a plurality of claws 36A and a plurality of claw stands 36B. The gripper 36 holds the recording medium P by sandwiching the leading end of the recording medium P between the claws 36A and the claw stands 36B. Therefore, the gripper 36 is an example of a holding unit that holds the recording medium P in the thickness direction.

The gripper 36 is disposed downstream of the recording medium P in the conveying direction and holds the leading end of the recording medium P from downstream of the recording medium P in the conveying direction. The gripper 36 is configured such that, for example, the claw 36A is pressed against the claw stand 36B by a spring or the like, and the claw 36A is separated from the claw stand 36B by the action of a cam or the like.

In this manner, in the conveying unit 14, the leading end of the recording medium P fed from the container (not illustrated) is held by the gripper 36. In the conveying unit 14, the chain 34 circulates in the circulating direction C while the gripper 36 is holding the leading end of the recording medium P, so that the gripper 36 is moved to convey the recording medium P and the recording medium P passes through the secondary transfer position T2 together with the gripper 36 while the recording medium P is being held by the gripper 36.

The gripper 36 is moved in the rotation direction of the transfer cylinder 50 together with the transfer cylinder 50 while being accommodated in the recess 54 of the transfer cylinder 50 at a portion where the chain 34 is wound around the sprocket 32. Similarly, at the portion where the chain 34 is wound around the sprocket 48, the gripper 36 is moved together with the pressurizing roller 44 in the rotation direction of the pressurizing roller 44 while being accommodated in the recess 46 of the pressurizing roller 44.

When the heating roller 72 is located at the separation position, the conveying unit 14 according to the present embodiment conveys the recording medium P toward the nip position NP while the gripper 36 retains the leading end of the recording medium P. When the conveying unit 14 conveys the recording medium P to the nip position NP, the conveying unit 14 releases the leading end of the recording medium P.

That is, the conveying unit 14 releases the leading end of the recording medium P after the gripper 36 has passed through the nip position NP. At this time, the pressurizing roller 44 is kept rotating, in other words, the chain 34 is kept circulating.

That the recording medium P has been conveyed to the nip position NP is detected by an elapsed time after a detector disposed upstream of the nip position NP in the conveying direction detects the leading end of the recording medium P. The detector may detect the supporter member 38 or the gripper 36 instead of the leading end of the recording medium P.

After the gripper 36 has passed through the nip position NP and the leading end of the recording medium P has been released from the gripper 36, the heating roller 72 starts moving from the separation position to the contact position to nips the recording medium P, which has been conveyed to the nip position NP, between the heating roller 72 and the pressurizing roller 44. While the recording medium P is nipped between the heating roller 72 and the pressurizing roller 44, the heating roller 72 starts rotating to convey the recording medium P.

The heating roller 72 may start moving from the separation position to the contact position before the leading end of the recording medium P is released from the gripper 36 as long as the nipping of the recording medium P between the heating roller 72 and the pressurizing roller 44 is completed after the leading end of the recording medium P is released from the gripper 36.

As described above, in the fixing device 70, the recording medium P is heated and pressed while being conveyed in a state in which the recording medium P is nipped between the heating roller 72 and the pressurizing roller 44, whereby the toner image transferred to the recording medium P is fixed to the recording medium P.

(Transfer Cylinder)

Now, a detailed description is given of the transfer cylinder 50.

Figure 5:
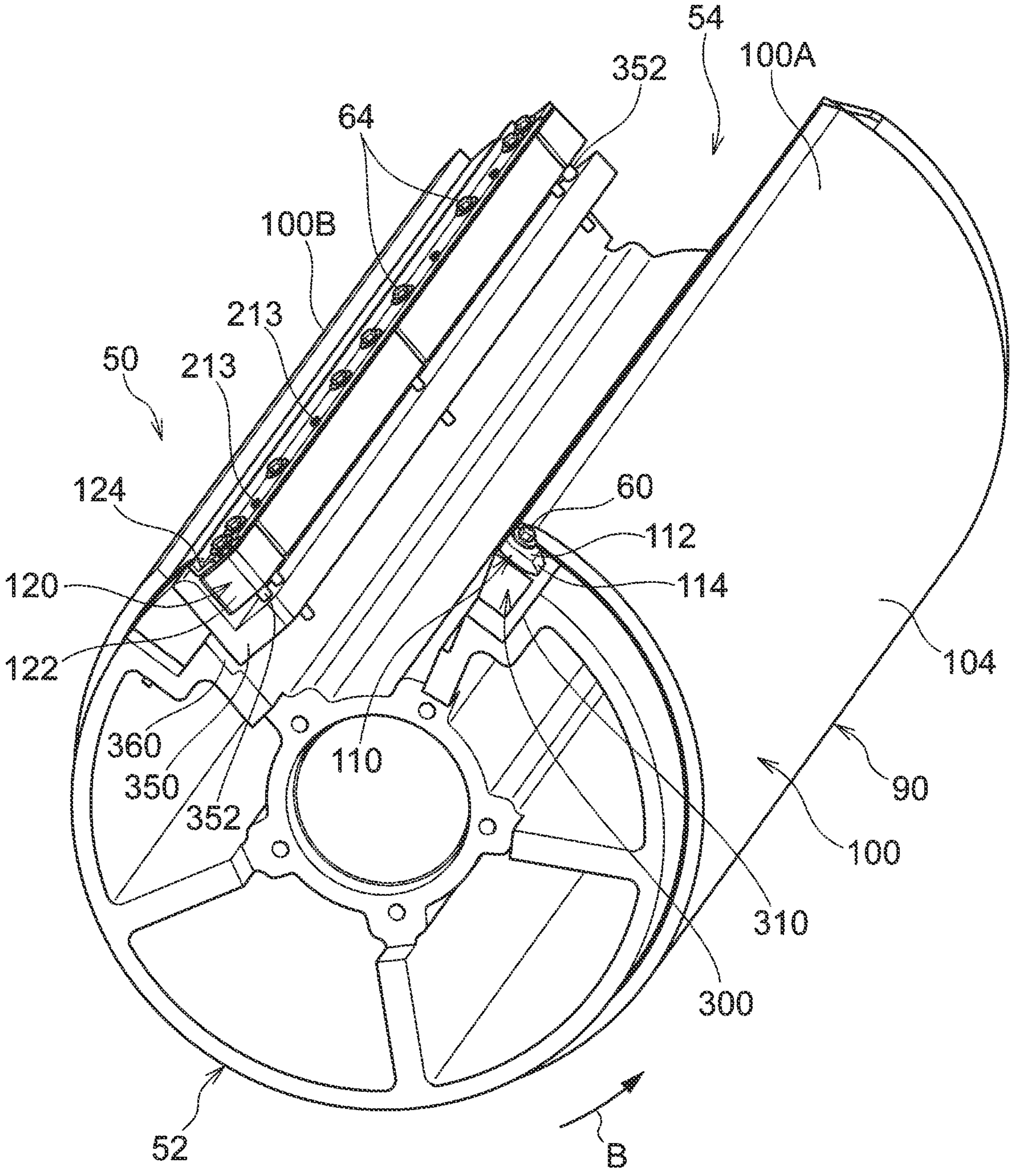
FIG. 5 is a perspective view of a transfer cylinder including a mounting member according to the first embodiment.
Figure 9:
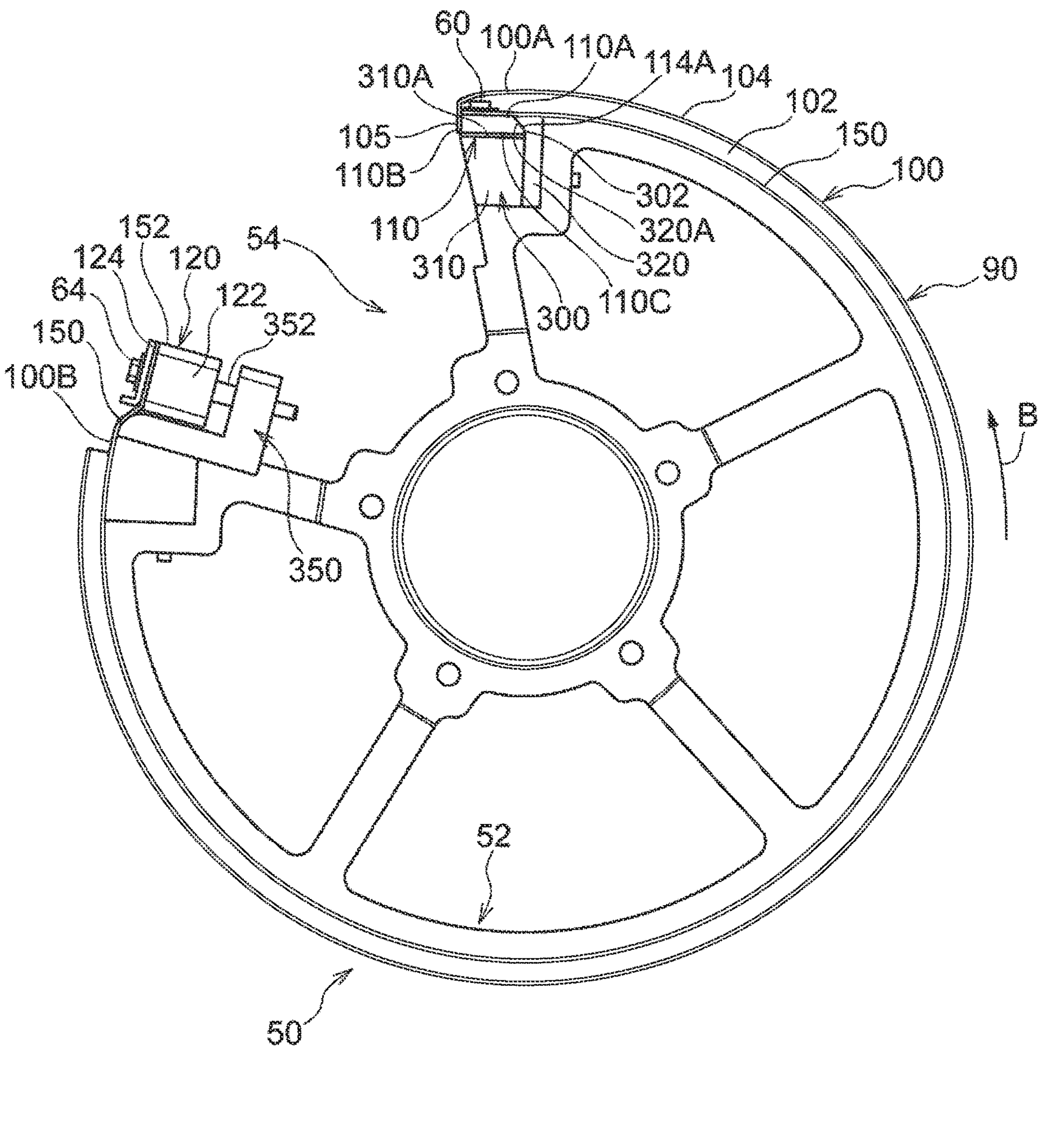
FIG. 9 is an end view of the transfer cylinder including the mounting member according to the first embodiment as viewed in an axial direction.

As illustrated in FIGS. 5 and 9, the transfer cylinder 50 includes a cylinder body 52 and a mounting member 90 wound around the cylinder body 52. The mounting member 90 includes a sheet member 100 having a rectangular shape in plan view. The transfer cylinder 50 is an example of a member that moves in a traveling direction. The transfer cylinder 50 is an example of a cylinder member. Hereinafter, the axial direction, the radial direction, and the circumferential direction of the cylinder body 52 may be simply referred to as "axial direction", "radial direction", and "circumferential direction", respectively.

Hereinafter, the upstream side in the rotation direction (arrow B direction) of the transfer cylinder 50 may be simply referred to as "upstream", and the downstream side in the rotation direction (arrow B direction) of the transfer cylinder 50 may be simply referred to as "downstream". The rotation direction is an example of the traveling direction of the mounting member 90. In a case where the circumferential direction and the axial direction are used in the description of the mounting member 90, the circumferential direction and the axial direction are directions in a state where the mounting member 90 is wound around the cylinder body 52. A direction along a short side of the sheet member 100 having a rectangular shape in plan view in the mounting member 90 is referred to as a width direction, and a direction along a long side is referred to as a length direction.

The cylinder body 52 has a single recess 54 formed along the axial direction in a part thereof in the circumferential direction and has a substantially circular cross section, specifically, the outer profile of the cross section orthogonal to the axial direction is substantial circular. The recess 54 as an example of a recessed portion has a depth along the radial direction of the cylinder body 52. The cylinder body 52 is made of a metal material such as stainless steel or aluminum. In the present embodiment, the depth direction of the recess 54 coincides with the radial direction. However, the depth direction and the radial direction do not need to coincide with each other. The depth direction may be inclined by, for example, about 5° to 10° with respect to the radial direction.

The cylinder body 52 has the length along the axial direction of the cylinder body 52 longer than the width of the sheet member 100 along the axial direction of the sheet member 100. The sheet member 100 is wound in a state where the central portion, in the width direction, of the sheet member 100 overlaps the central portion, in the axial direction, of the cylinder body 52. The width of the sheet member 100 is larger than the maximum width of the recording medium P (see FIG. 4).

The sheet member 100 is formed of a sheet-shaped plate-like body. The term "sheet-like" refers to the shape of a thin plate or the like having a thickness allowing deformation along the outer periphery of the cylinder body 52. The thickness of the sheet member 100 is preferably equal to or greater than 3 mm and equal to or smaller than 15 mm, more preferably equal to or greater than 4 mm and equal to or smaller than 12 mm, and even more preferably equal to or greater than 5 mm and equal to or smaller than 10 mm. The length of the sheet member 100 in the circumferential direction (length direction) is substantially the same as the length of the cylinder body 52 in the circumferential direction excluding the recess 54.

As illustrated in FIGS. 5, 6, 8, 9, and 11, the mounting member 90 includes an attachment portion 110 provided at one end portion 100A of the sheet member 100 in the length direction. The attachment portion 110 has a function of attaching the one end portion 100A side of the sheet member 100 of the mounting member 90 to a base portion 300 of the transfer cylinder 50. The attachment portion 110 is provided at the one end portion 100A of a reverse surface 151 of the downstream side portion of the sheet member 100 in the rotation direction. In other words, the attachment portion 110 is disposed on the upstream side of the recess 54 of the transfer cylinder 50 in the rotation direction in a state in which the sheet member 100 is wound around the outer peripheral surface of the transfer cylinder 50.

Figure 10:
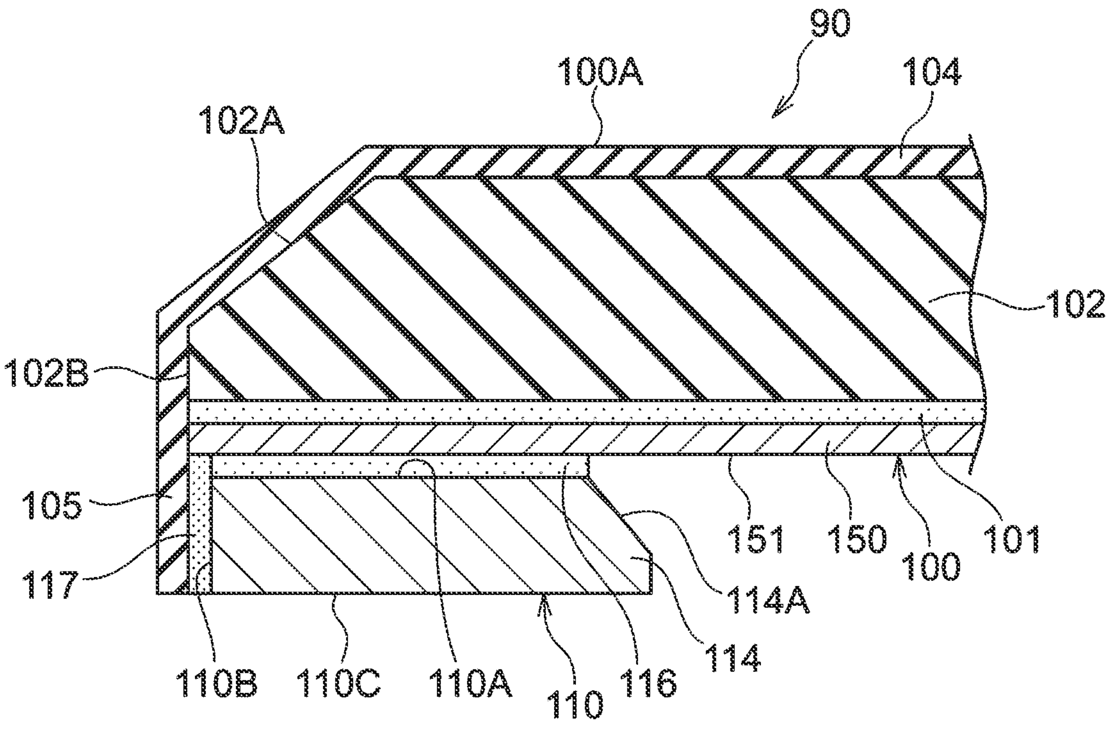
FIG. 10 is a cross-sectional view illustrating the downstream end portion of the mounting member according to the first embodiment in a traveling direction.

As illustrated in FIG. 10, the sheet member 100 has a plurality of layers. For example, the sheet member 100 has a three layer structure. In the present embodiment, the sheet member 100 includes a metal layer 150 that is wound in contact with the outer peripheral surface of the cylinder body 52, a foam rubber layer 102 that is stacked on the outer peripheral surface of the metal layer 150, and a solid rubber layer 104 that is stacked on the outer peripheral surface of the foam rubber layer 102. The foam rubber layer 102 is bonded to the metal layer 150 with an adhesive 101.

For example, a metal material such as stainless steel, aluminum, or copper is used for the metal layer 150. The metal layer 150 is formed of stainless steel in the present embodiment. The thickness of the metal layer 150 in the present embodiment is, for example, 0.1 mm.

The foam rubber layer 102 is a layer formed of foam rubber (that is, sponge rubber). The foam rubber layer 102 is made of, for example, a resin material such as nitrile rubber, chloroprene rubber, ethylene-propylene-diene rubber, acrylonitrile-butadiene rubber, styrene-butadiene rubber, silicone rubber, fluoro-rubber, polyurethane, polyethylene, or a mixture thereof.

The solid rubber layer 104 is made of solid rubber (that is, hard rubber) and is harder than the foam rubber layer 102. For the solid rubber layer 104, for example, a resin material such as nitrile rubber, chloroprene rubber, ethylene propylene diene rubber, acrylonitrile butadiene rubber, silicone rubber, or a mixture thereof is used. For example, the inner peripheral surface of the solid rubber layer 104 is joined to the outer peripheral surface of the foam rubber layer 102 by heating and melting the outer peripheral surface of the foam rubber layer.

The solid rubber layer 104 is joined to the outer peripheral surface of the foam rubber layer 102. The total thickness of the two layers, namely, the solid rubber layer 104 and the foam rubber layer 102, in the present embodiment is greater than the thickness of the metal layer 150 and is, for example, 7.0 mm.

Figure 6:
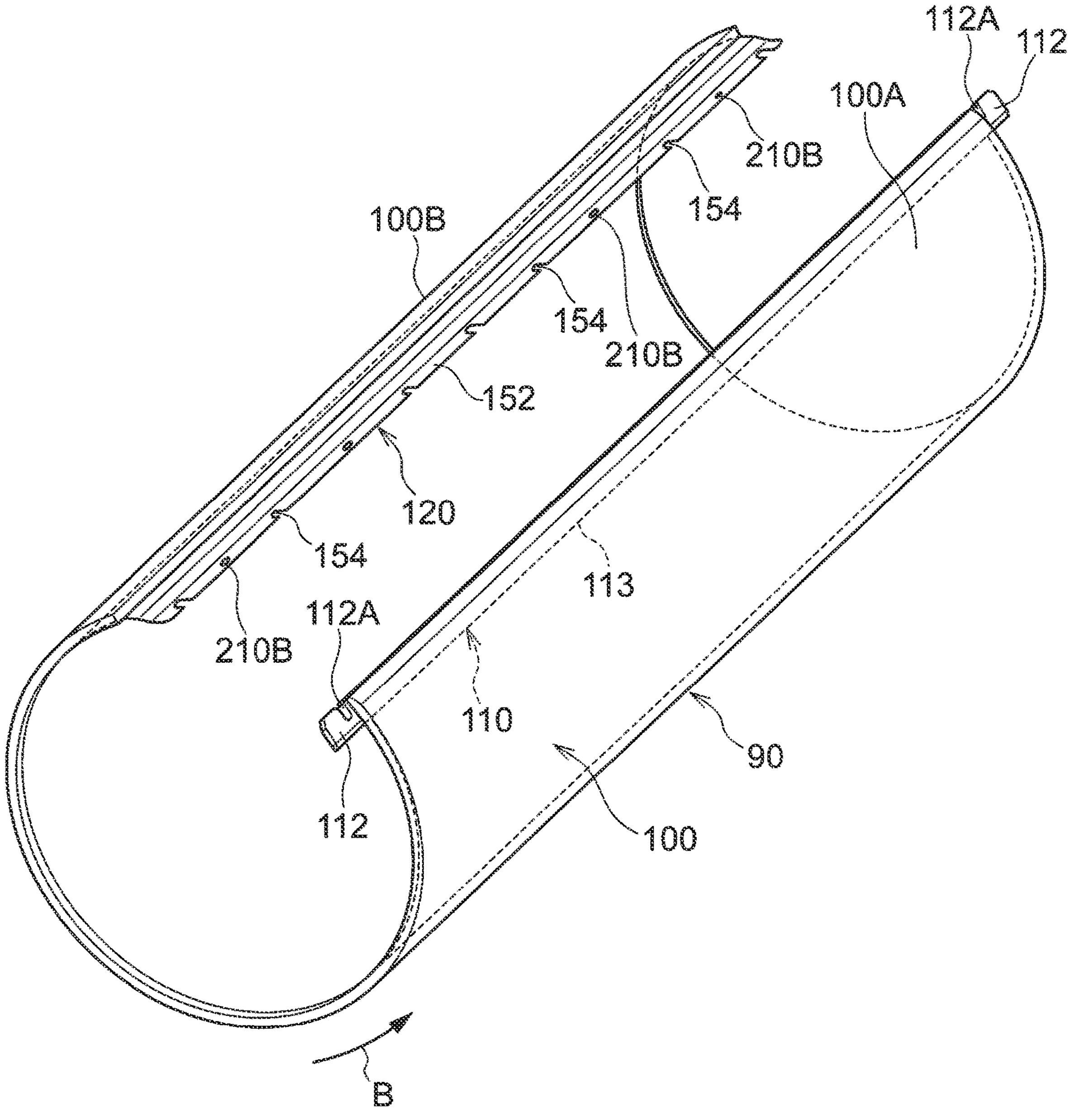
FIG. 6 is a perspective view of the mounting member according to the first embodiment.
Figure 7:
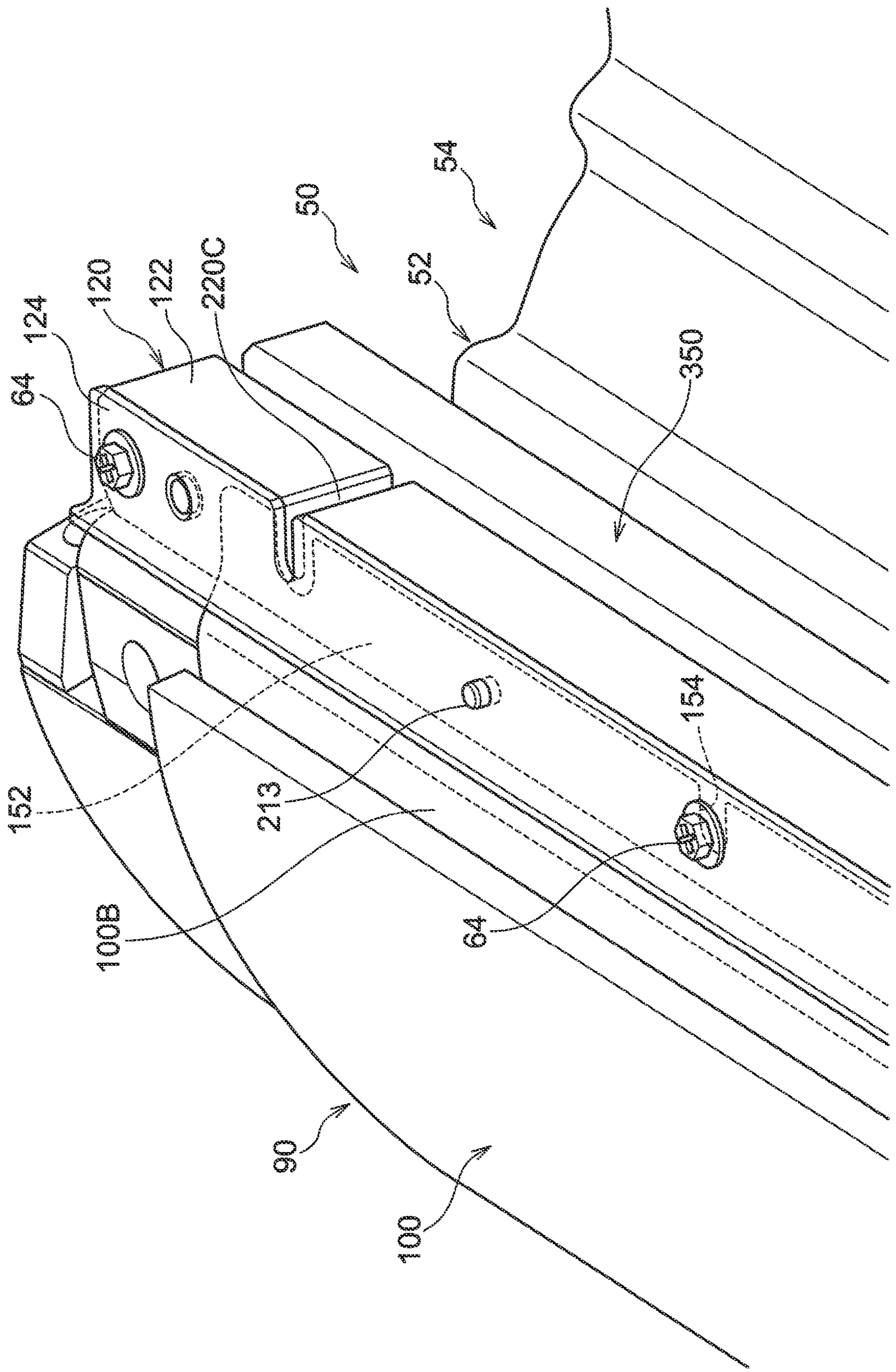
FIG. 7 is an enlarged perspective view of an axial end portion of a recess of the transfer cylinder including the mounting member according to the first embodiment on the other side.
Figure 11:
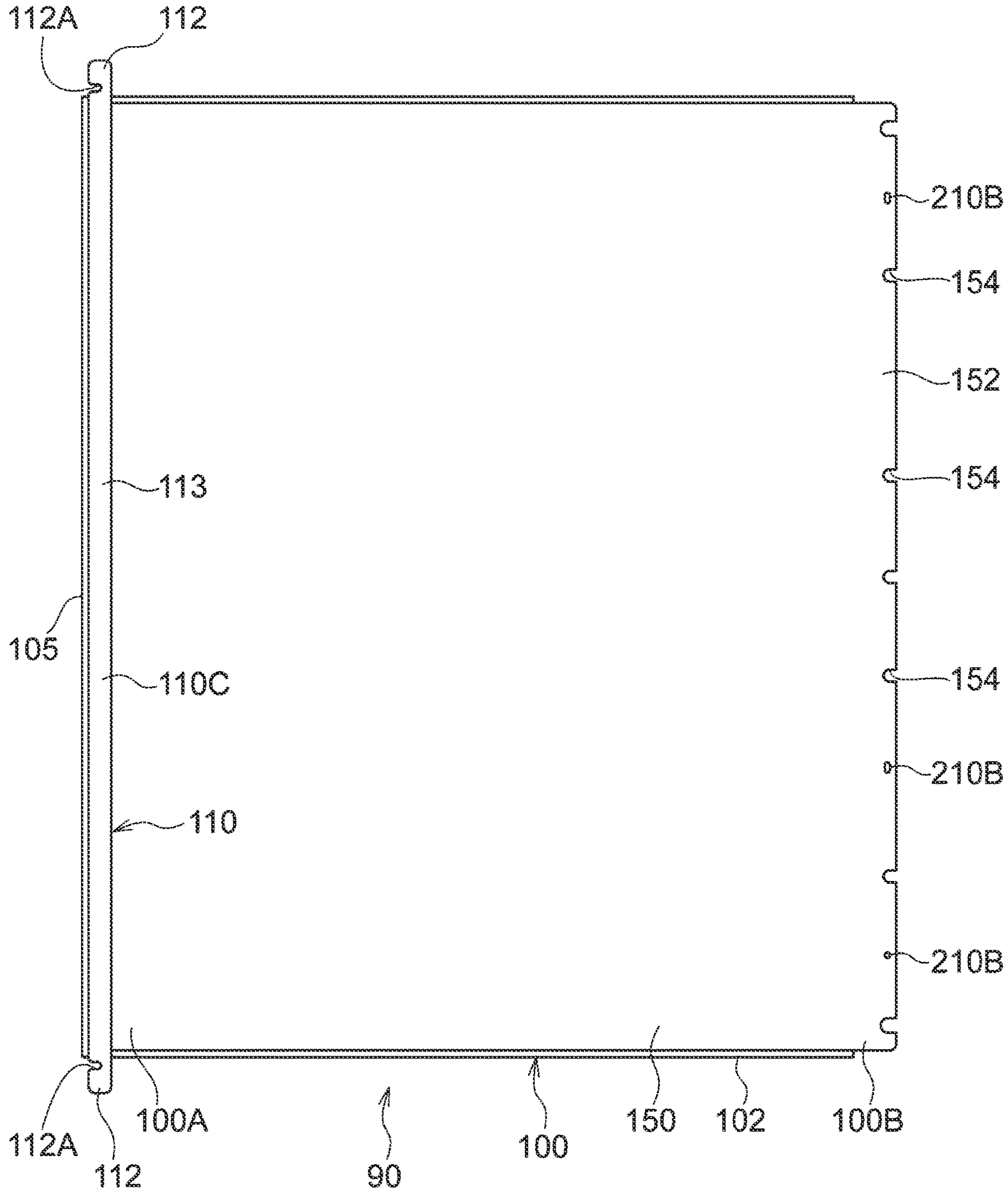
FIG. 11 is a plan view of the mounting member according to the first embodiment as viewed from a metal layer side.

As illustrated in FIGS. 6, 10, 11, and the like, the attachment portion 110 has a plate-like shape that is long in the axial direction and has the radial direction as the thickness direction. The attachment portion 110 is made of a metal material such as stainless steel or aluminum. The attachment portion 110 includes a pair of projecting portions 112 that protrude from the sheet member 100 toward both sides in the axial direction, and a central portion 113 that is disposed between the pair of projecting portions 112. The central portion 113 is disposed within the range of the sheet member 100 as viewed in the thickness direction of the sheet member 100, in other words, as viewed in the radial direction. In other words, the entire central portion 113 overlaps the sheet member 100 as seen in the thickness direction of the sheet member 100.

As illustrated in FIG. 10, the attachment portion 110 includes a first surface 110A that is bonded to the one end portion 100A of the reverse surface 151 of the sheet member 100. The attachment portion 110 includes a second surface 110B that intersects with the first surface 110A and faces the downstream side of the sheet member 100 in the rotation direction, and a third surface 110C located on the opposite side to the first surface 110 A. The second surface 110B is an end face of the attachment portion 110 which is located on the downstream side in the rotation direction. The second surface 110B and the third surface 110C are examples of surfaces facing directions different from the first surface 110A.

Further, at a portion of the attachment portion 110 on the opposite side (upstream side in the rotation direction) to the second surface 110B, a protruding portion 114 protruding in the direction opposite to the second surface 110B and having a triangular shape as viewed from the axial direction is formed (see also FIG. 9). The protruding portion 114 has an inclined surface 114A whose width in the circumferential direction decreases toward the sheet member 100.

The first surface 110A is bonded to the one end portion 100A of the reverse surface 151 of the sheet member 100 (the reverse surface 151 on the downstream side in the rotation direction) with an adhesive 116. In the present embodiment, the first surface 110A is bonded to the metal layer 150 constituting the reverse surface 151 of the sheet member 100 with the adhesive 116. For example, the first surface 110A of the central portion 113 of the attachment portion 110 is bonded to the one end portion 100A of the reverse surface 151 of the sheet member 100.

The sheet member 100 includes a turnaround portion 105 which is a part of the sheet member 100 running around the second surface 110B side of the attachment portion 110. The turnaround portion 105 is bonded to the second surface 110B of the attachment portion 110 with an adhesive 117. The turnaround portion 105 is formed of the solid rubber layer 104 that is one of a plurality of layers. That is, in the present embodiment, the turnaround portion 105 formed by the solid rubber layer 104 harder than the foam rubber layer 102 is bonded to the second surface 110B. As the adhesive 117 and the adhesive 116, different types of adhesive materials may be used or the same type of adhesive material may be used depending on the material of the sheet member 100 to be bonded.

In the present embodiment, the foam rubber layer 102 includes, at the downstream end portion of the sheet member 100 in the rotation direction, an inclined surface 102A whose thickness gradually decreases radially inward and an end face 102B adjacent to the inclined surface 102A. The solid rubber layer 104 covers the inclined surface 102A and the end face 102B of the foam rubber layer 102 and forms the turnaround portion 105 extending toward the end face of the metal layer 150 and the second surface 110B of the attachment portion 110.

Through holes 112A through which attachment screws 60 (see FIGS. 5, 8, 9, and 12) extend are formed in a pair of projecting portions 112. The through hole 112A in the present embodiment has a U shape with the other side in the circumferential direction being opened.

Figure 8:
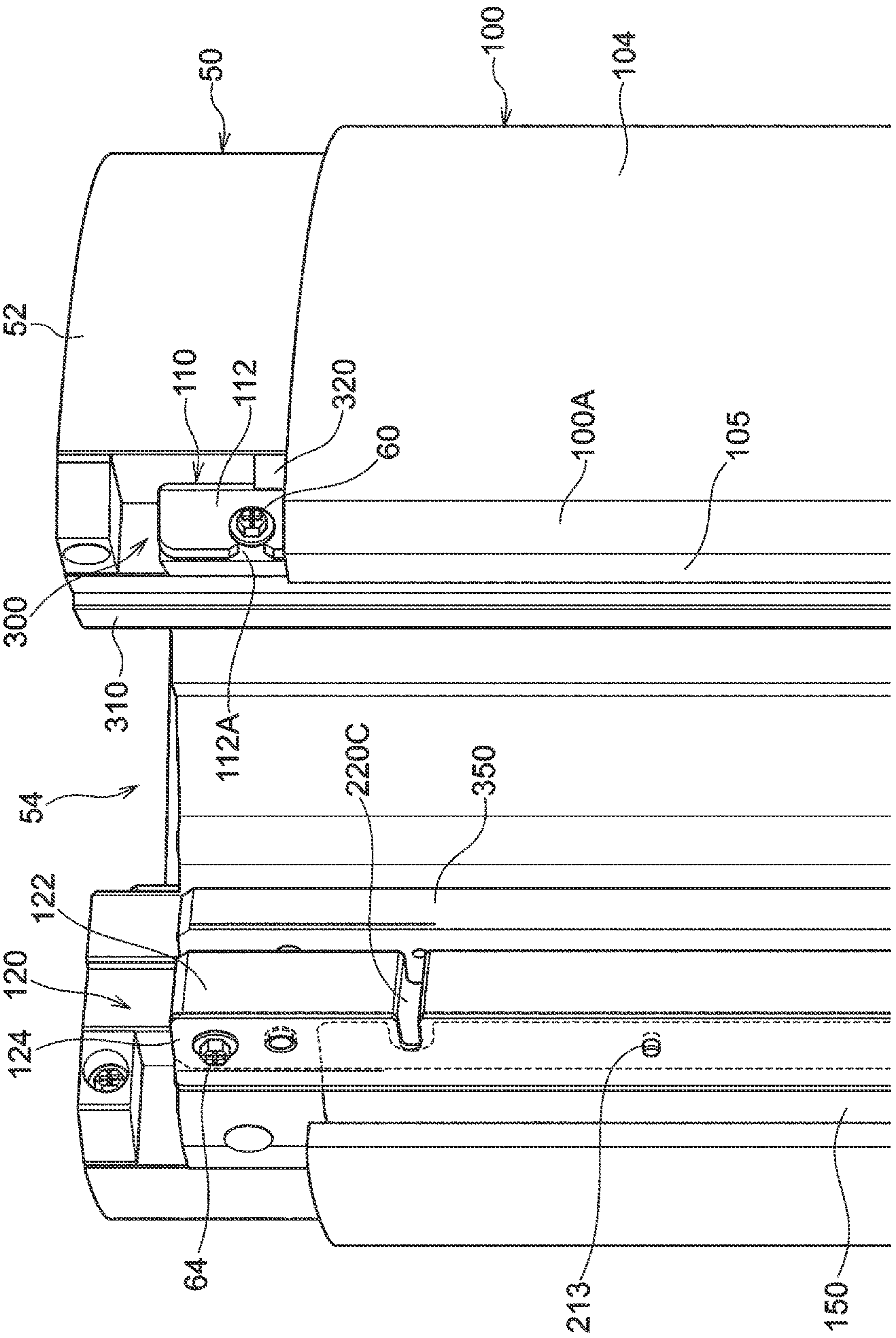
FIG. 8 is an enlarged perspective view of an axial end portion of a recess of a transfer cylinder including the mounting member according to the first embodiment.

As illustrated in FIGS. 6, 8, and 11, an end portion 152 of the metal layer 150 which extends in the circumferential direction more than the foam rubber layer 102 and the solid rubber layer 104 is formed at the other end portion 100B of the sheet member 100. In the end portion 152 of the metal layer 150, a plurality of U-shaped fixing grooves 154 and a plurality of positioning holes 210B are formed at intervals in the axial direction.

As illustrated in FIGS. 5 and 7 to 9, an attachment member 120 is provided at the other end portion 100B of the sheet member 100. The attachment member 120 includes a fixing plate 124 having a plate shape long in the axial direction and a substantially quadrangular prism-shaped fixed portion 122. The end portion 152 of the metal layer 150 at the other end portion 100B of the sheet member 100 is sandwiched between the fixing plate 124 and the fixed portion 122 and is fixed to the attachment member 120 by being fastened with fixing screws 64 (see FIG. 5) extending through the fixing grooves 154.

Positioning pins 213 extend through the positioning holes of the fixing plate 124 and the fixed portion 122 formed at the same position as the positioning holes 210B, so that the end portion 152 of the metal layer 150 is positioned to the attachment member 120.

Figure 12:
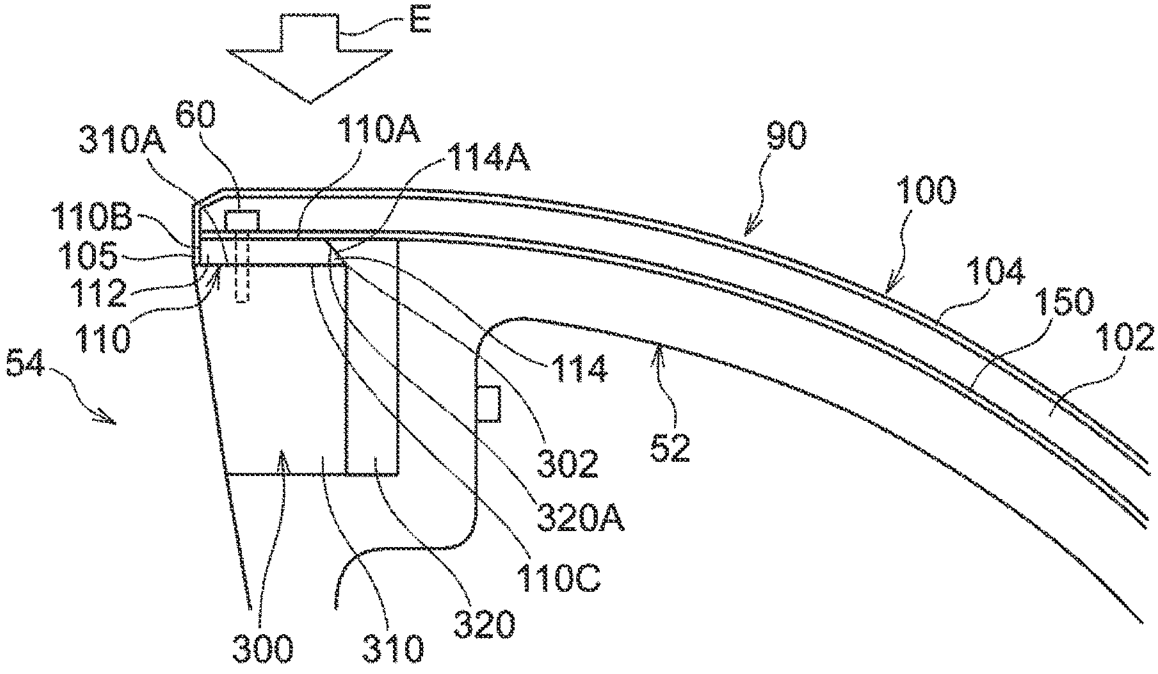
FIG. 12 is a cross-sectional view illustrating a state in which the downstream end portion of the mounting member according to the first embodiment in the traveling direction is attached to the transfer cylinder.

As illustrated in FIGS. 5 and 9, the base portion 300 to which the attachment portion 110 of the one end portion 100A of the sheet member 100 is attached is provided on one side in the recess 54 of the cylinder body 52 in the circumferential direction (the upstream side in the rotational direction with respect to the recess 54) (see also FIGS. 8 and 12). The base portion 300 is an example of an attachment-receiving portion. The base portion 300 has a main body portion 310 and a wall portion 320 joined to one side of the main body portion 310 (see also FIG. 12). As illustrated in FIG. 8, the main body portion 310 projects axially outward beyond the wall 320. As illustrated in FIG. 9, the wall portion 320 extends outward in the radial direction from a contact surface 310A, which will be described below, of the main body portion 310. The base portion 300 is made of a metal or resin. Since the sheet member 100 is a thin plate-like body and includes the foam rubber layer 102 and the solid rubber layer 104, the sheet member 100 is more easily elastically deformed than the base portion 300.

As illustrated in FIGS. 9 and 12, the main body portion 310 forming the base portion 300 has the contact surface 310A that is in contact with the third surface 110C of the attachment portion 110. The wall portion 320 includes an abutment surface 320A against which the inclined surface 114A of the protruding portion 114 of the attachment portion 110 abuts. The abutment surface 320A is inclined toward the other side (a side that recedes from the recess 54) outward in the radial direction. In other words, the recess 302 having a triangular shape as viewed in the axial direction is formed on one side of the base portion 300 in the circumferential direction (see FIG. 12).

The attachment portion 110 is attached to the base portion 300 in a state in which the attachment portion 110 is disposed outside the base portion 300 in the radial direction. As illustrated in FIG. 8, the one end portion 100A of the sheet member 100 is attached to the base portion 300 by being screwed to both axial end portions of the main body portion 310 of the base portion 300 provided in the recess 54 of the cylinder body 52 with attachment screws 60 extending through holes 115 formed in the projecting portion 112 of the attachment portion 110 (see also FIG. 5). The attachment screw 60 is an example of a fixture. Accordingly, the one end portion 100A side of the mounting member 90 is attached to the cylinder body 52. As illustrated in FIG. 12, the projecting portions 112 at both axial ends of the attachment portion 110 of the mounting member 90 are attached to the base portion 300 by fixing the attachment screws 60 in the radial direction of the base portion 300 (arrow E direction).

At this time, as illustrated in FIG. 9, the third surface 110C of the attachment portion 110 is in contact with the contact surface 310A of the base portion 300. Further, the protruding portion 114 of the attachment portion 110 is inserted into the recess 302 and abuts against the recess 302 in the circumferential direction, and the inclined surface 114A abuts against the abutment surface 320A.

The attachment portion 110 can be detached from the base portion 300 by removing the attachment screws 60.

As illustrated in FIGS. 5 and 7 to 9, a base portion 350 to which the attachment member 120 of the other end portion 100B of the sheet member 100 is attached is provided on the other side in the recess 54 of the cylinder body 52 in the circumferential direction (the upstream side in the rotational direction with respect to the recess 54).

In the present embodiment, the base portion 350 is joined to a support portion 360 (see FIG. 5) provided in the recess 54. The base portion 350 has an L shape when viewed in the axial direction, and the base portion 350 is provided with guide pins 352 that protrude outward in the radial direction. As illustrated in FIG. 5, the guide pins 352 are provided on both sides in the axial direction.

The attachment member 120 is positioned in the circumferential direction and the axial direction by inserting the guide pins 352 of the base portion 350 provided in the recess 54 of the cylinder body 52 into guide holes 220C (see FIG. 7) of the attachment member 120.

As illustrated in FIG. 1, when the transfer cylinder 50 is rotated, an upstream opening edge portion of the recess 54 of the cylinder body 52 in the rotation direction comes into contact with the counter roller 24 through the transfer belt 30. In the present embodiment, the base portion 300 is provided at an edge portion of the cylinder body 52 which is located on the upstream side of the recess 54 of the outer peripheral surface of the cylinder body 52 in the rotation direction. The attachment portion 110 is attached to the base portion 300 in a state in which the attachment portion 110 is disposed on the base portion 300.

(Operation and Effect According to Present Embodiment)

The operation and effect of the present embodiment will be described next.

The mounting member 90 includes the sheet member 100 and the attachment portion 110 attached to the one end portion 100A of the sheet member 100 on the downstream side in the rotation direction. The first surface 110A of the attachment portion 110 is bonded to the one end portion 100A of the reverse surface 151 of the sheet member 100, and the second surface 110B facing a direction different from that of the first surface 110A of the attachment portion 110 is bonded to the turnaround portion 105 of the sheet member 100.

The sheet member 100 of the mounting member 90 is wound around the outer peripheral surface of the cylinder body 52 except for the recess 54. The transfer cylinder 50 including the cylinder body 52 and the mounting member 90 rotates in the arrow B direction. Since the cylinder body 52 includes the recess 54, the sheet member 100 of the mounting member 90 cannot have an endless shape, and the sheet member 100 has the one end portion 100A on the downstream side of the cylinder body 52 in the rotation direction. Accordingly, when the one end portion 110A of the sheet member 100 on the downstream side in the rotation direction reaches the secondary transfer position T2 (see FIG. 1), the one end portion 100A of the opening edge portion of the recess 54 on the downstream side in the rotation direction of the sheet member 100 collides with the counter roller 24 through the transfer belt 30. Therefore, distortion tends to occur in the circumferential direction near the one end portion 100A of the sheet member 100 on the downstream side in the rotation direction.

Figure 17:
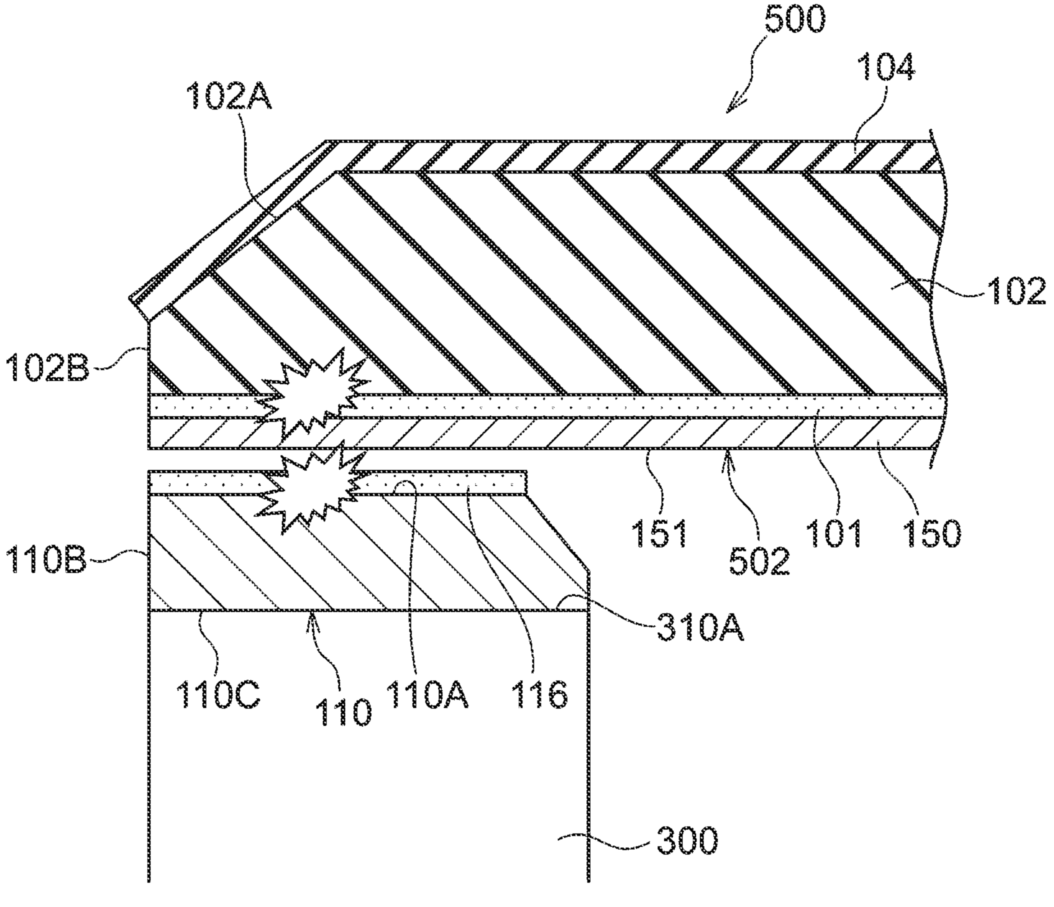
FIG. 17 is a cross-sectional view illustrating a state in which the downstream end portion of a mounting member according to a first comparative example in the traveling direction is attached to the transfer cylinder.

A mounting member 500 according to the first comparative example will now be described with reference to FIG. 17. As illustrated in FIG. 17, the mounting member 500 includes a sheet member 502 and the attachment portion 110. The sheet member 502 includes the metal layer 150, the foam rubber layer 102 bonded to the metal layer 150 with the adhesive 101, and the solid rubber layer 104 stacked on the foam rubber layer 102. Although the solid rubber layer 104 is stacked on the inclined surface 102A of the foam rubber layer 102, the end face 102B of the foam rubber layer 102 on the downstream side in the rotation direction is not covered with the solid rubber layer 104.

In the mounting member 500, only the first surface 110A of the attachment portion 110 is bonded to the reverse surface 151 of the sheet member 502 (that is, the reverse surface of the metal layer 150) with the adhesive 116. In a state where the third surface 110C of the attachment portion 110 is in contact with the contact surface 310A of the base portion 300, the attachment portion 110 is fixed to the base portion 300 with attachment screws (not illustrated).

In the mounting member 500 as described above, when the portion of the sheet member 502 on the downstream side in the rotation direction collides with the counter roll 24 through the transfer belt 30, the reverse surface 151 of the sheet member 100 is easily peeled off from the first surface 110 A of the attachment portion 110 by the load acting on the sheet member 502 (see FIG. 17).

In contrast to this, in the mounting member 90 according to the present embodiment, as described above, the second surface 110B facing a direction different from that of the first surface 110A of the attachment portion 110 is bonded to the turnaround portion 105 of the sheet member 100. Accordingly, in the mounting member 90, the sheet member 100 is less likely to peel off from the attachment portion 110 than when only the first surface 110A of the attachment portion 110 is bonded to the sheet member 502 (that is, the attachment portion 110 is bonded only to the reverse surface 151 of the sheet member 502).

Further, the mounting member 90 includes the turnaround portion 105 formed by making a part of the sheet member 100 turn around to the second surface 110B intersecting the first surface 110A of the attachment portion 110. The second surface 110B faces the downstream side of the sheet member 100 in the rotation direction, and the turnaround portion 105 is bonded to the second surface 110B. For this reason, in the mounting member 90, the sheet member 100 is less likely to peel off from the attachment portion 110 than when the turnaround portion is bonded to a surface other than the second surface 110B facing the traveling direction of the attachment portion 110.

Further, in the mounting member 90, the sheet member 100 is more easily elastically deformed than the base portion 300. Accordingly, the performance of the mounting member 90 is stabilized as compared with a case where the sheet member is formed of only a member harder than the base portion 300 in the mounting member 90. Examples of the performance of the mounting member 90 include the performance of improving image quality in a configuration in which a toner image is transferred from the transfer belt 30 to the recording medium P between the transfer cylinder 50 and the transfer belt 30.

In addition, in the mounting member 90, the sheet member 100 has a plurality of layers. In the present embodiment, the sheet member 100 includes the metal layer 150, the foam rubber layer 102, and the solid rubber layer 104. Accordingly, in the mounting member 90, it is easy to add a function compared to a case where the sheet member is a single layer. Examples of the performance include the performance of the solid rubber layer 104 in terms of its ability to improve the peeling posture of the recording medium P and the performance of the solid rubber layer 104 in terms of its ability to improve the toner cleaning performance.

In addition, in the mounting member 90, the solid rubber layer 104, which is one of the plurality of layers of the sheet member 100, is bonded to the second surface 110B facing a direction different from that of the first surface 110A of the attachment portion 110. Accordingly, the mounting member 90 can be manufactured more easily than when two or more layers of the sheet member are bonded to a surface of the attachment portion 110 which faces a direction different from that of the first surface 110A.

In addition, in the mounting member 90, the sheet member 100 includes the foam rubber layer 102, and the turn-around portion 105 formed of the solid rubber layer 104 harder than the foam rubber layer 102 is bonded to the second surface 110B facing a direction different from that of the first surface 110A of the attachment portion 110. For this reason, in the mounting member 90, the peeling of the sheet member 100 from the attachment portion 110 is suppressed compared to a case where the foam rubber layer is bonded to a surface of the attachment portion 110 which faces a direction different from that of the first surface 110A.

In the mounting member 90, the attachment portion 110 is a plate-like metal member. For this reason, the mounting member 90 is manufactured more easily than when the attachment portion is a block-like member.

The transfer cylinder 50 according to the present embodiment includes the cylinder body 52 having the recess 54 formed along the axial direction and the mounting member 90 wound around the outer peripheral surface of the cylinder body 52 except for the recess 54. As the cylinder body 52 rotates in the circumferential direction, the opening edge portion of the recess 54 on the upstream side in the rotation direction abuts on the counter roller 24 through the transfer belt 30. A base portion 300 is provided in a portion of the cylinder body 52 on the upstream side in the rotation direction with respect to the recess 54, and the attachment portion 110 is attached to the base portion 300 in a state where the attachment portion 110 is disposed on the base portion 300.

When a portion of the sheet member 100 which is located near the attachment portion 110 on the downstream side in the rotation direction comes into contact with the counter roller 24 through the transfer belt 30 due to the rotation of the transfer cylinder 50, a load is applied to the downstream side of the sheet member 100 in the rotation direction. Even in such a case, the sheet member 100 is less likely to peel off from the attachment portion 110 in the transfer cylinder 50 than when only the first surface 110A of the attachment portion 110 is bonded to the sheet member 502.

In the transfer cylinder 50, the projecting portions 112 at both axial ends of the attachment portion 110 of the mounting member 90 are attached to the base portion 300 by fixing the attaching screws 60 in the radial direction of the base portion 300.

Figure 18:
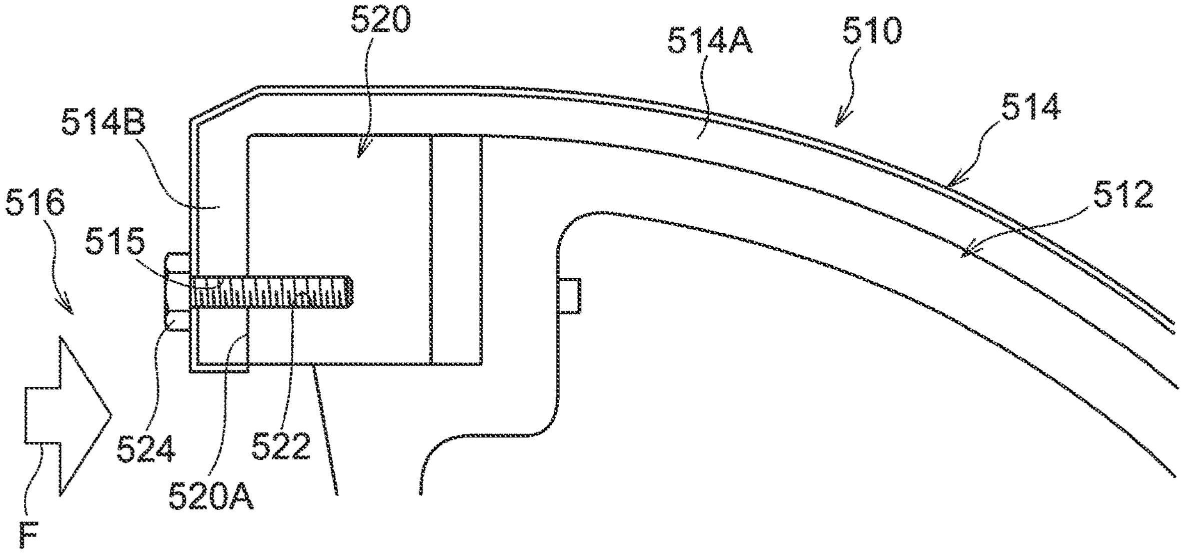
FIG. 18 is a cross-sectional view illustrating a state in which the downstream end portion of a mounting member according to a second comparative example in the traveling direction is attached to the transfer cylinder.

A transfer cylinder 510 according to a second comparative example will be described with reference to FIG. 18. As illustrated in FIG. 18, the transfer cylinder 510 includes a cylinder body 512 having a recess 516 and a mounting member 514 mounted on the outer peripheral surface of the cylinder body 512. The cylinder body 512 includes a base portion 520 that is fixed to an upstream side of the recess 516 in the rotation direction. A screw hole 522 is provided in a side surface 520A of the base portion 520 in the recess 516. The screw hole 522 opens in the recess 516.

The mounting member 514 includes a sheet member 514A and an attachment portion 514B that is bent inward in the radial direction from one end side (the downstream side in the rotation direction) of the sheet member 514A in the circumferential direction. The attachment portion 514B and the sheet member 514A are integrally formed. In a state in which the attachment portion 514B is in contact with the side surface 520A of the base portion 520, an attachment screw 524 is inserted into a through hole 515 of the attachment portion 514B and is fastened to the screw hole 522 of the base portion 520. Accordingly, the attachment portion 514B of the mounting member 514 is fixed to the base portion 520.

In the mounting member 514, when the attachment screw 524 is fastened to the screw hole 522 of the base portion 520, the operator needs to reach his/her hand from a side in the recessed portion 516 as indicated by an arrow F. For this reason, when the mounting member 514 is fixed to the base portion 520, it is difficult to fasten the attachment screw 524.

In contrast to this, in the transfer cylinder 50 according to the present embodiment, as illustrated in FIG. 12, the projecting portions 112 at both axial ends of the attachment portion 110 of the mounting member 90 are attached to the base portion 300 by fixing the attaching screws 60 in the radial direction of the base portion 300 (arrow E direction). Accordingly, as compared with the case where the attachment portion 514B is attached to the base portion 520 from the side surface side of the recess 516 in the transfer cylinder 50, the operator can easily reach his/her hand to the attachment portion 110 when fixing the attachment portion 110 to the base portion 300 with the attachment screw 60 and can easily fasten the attachment screw 60.

The image forming apparatus 10 according to the present embodiment includes the transfer cylinder 50 that conveys the recording medium P and the counter roller 24 that is in contact with the transfer cylinder 50 through the transfer belt 30. At the secondary transfer position T2 between the counter roll 24 and the transfer cylinder 50, the toner image formed on the transfer belt 30 is transferred to the recording medium P conveyed by the transfer cylinder 50. Accordingly, in the image forming apparatus 10, when a portion of the sheet member 100 which is located near the attachment portion 110 comes into contact with the counter roller 24 through the transfer belt 30 as the transfer cylinder 50 rotates, the sheet member 100 is less likely to peel off from the attachment portion 110 than when only the first surface 110A of the attachment portion 110 is bonded to the sheet member 502.

The result of evaluating the peeling between the sheet member 100 and the attachment portion 110 of the mounting member 90 according to the present embodiment will be described next.

An evaluation item is the peeling between the sheet member 100 and the attachment portion 110 according to the number of printed sheets. When the sheet member 100 and the attachment portion 110 peel off from each other, an image formation failure occurs due to the floating of the peeled portion. In the experiment, the recording medium P was printed by the image forming apparatus 10 using the transfer cylinder 50 on which the mounting member 90 according to the present embodiment was mounted and the transfer cylinder on which the mounting member 500 according to the first comparative example was mounted. The number of printed sheets was evaluated in terms of 1,000 sheets (hereinafter, described as 1 KPV), 100×1000 sheets (hereinafter, described as 100 KPV), and 5000×1000 sheets (hereinafter, described as 5000 KPV).

As a result, in the mounting member 500 according to the first comparative example, the sheet member 502 and the attachment portion 110 did not peel off from each other when the number of printed sheets was 1 KPV, but the sheet member 502 and the attachment portion 110 partially peeled off from each other when the number of printed sheets was 100 KPV. Further, in the mounting member 500, when the number of printed sheets was 5000 KPV, peeling occurred in a wide area between the sheet member 502 and the attachment portion 110.

In contrast to this, in the mounting member 90 according to the present embodiment, the peeling between the sheet member 100 and the attachment portion 110 did not occur in all the cases in which the number of printed sheets is 1 KPV, 100 KPV, and 5000 KPV.

Second Embodiment

A mounting member 400 according to the second embodiment will be described next with reference to FIG. 13. The same components as those of the first embodiment described above are denoted by the same reference numerals, and a description thereof will be omitted.

Figure 13:
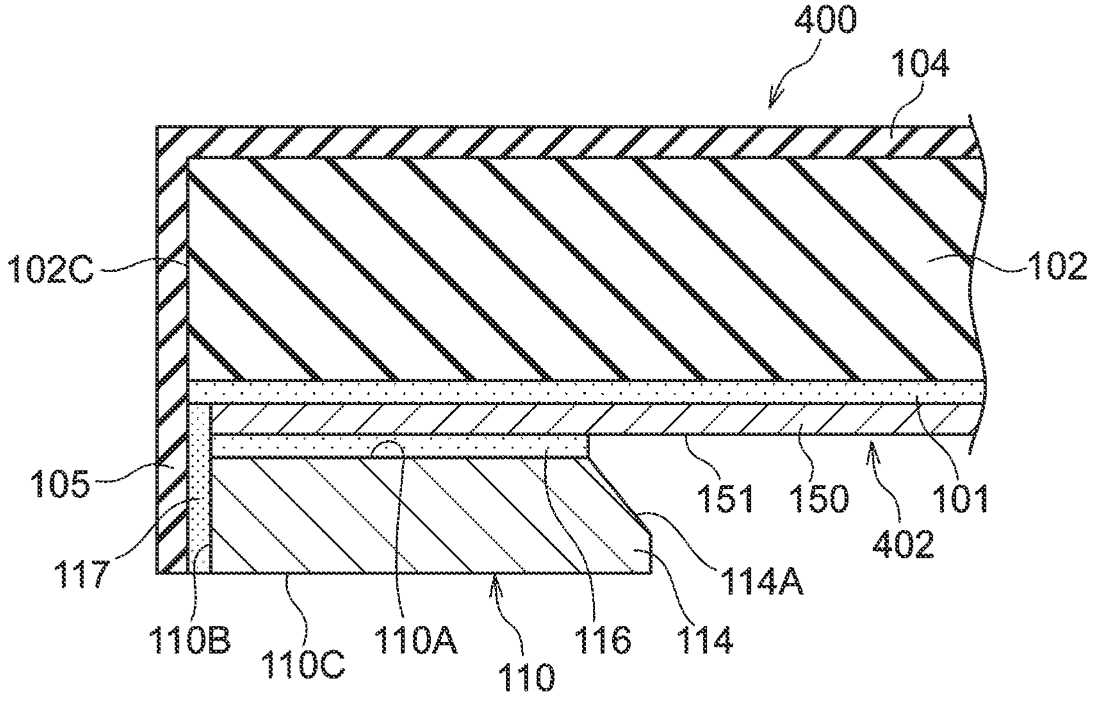
FIG. 13 is a cross-sectional view illustrating the downstream end portion of a mounting member according to a second embodiment in the traveling direction.

As illustrated in FIG. 13, the mounting member 400 includes a sheet member 402 and an attachment portion 110. The sheet member 402 includes a metal layer 150, a foam rubber layer 102, and a solid rubber layer 104.

In the second embodiment, the shapes of the foam rubber layer 102 and the solid rubber layer 104 are different from those of the sheet member 100 according to the first embodiment. One end side of the foam rubber layer 102 in the circumferential direction (that is, the downstream side in the rotation direction) has a rectangular shape. An end face 102C of the foam rubber layer 102 is covered with the solid rubber layer 104, and the solid rubber layer 104 extends toward a second surface 110B of the attachment portion 110 to form a turnaround portion 105. Other configurations of the mounting member 400 are the same as those of the mounting member 90 according to the first embodiment.

Since the mounting member 400 has the same configuration as that of the mounting member 90 according to the first embodiment, the same operation and effect as those of the mounting member 90 can be obtained.

Third Embodiment

A mounting member 410 according to the third embodiment will be described next with reference to FIG. 14. The same components as those of the first and second embodiments described above are denoted by the same reference numerals, and a description thereof will be omitted.

Figure 14:
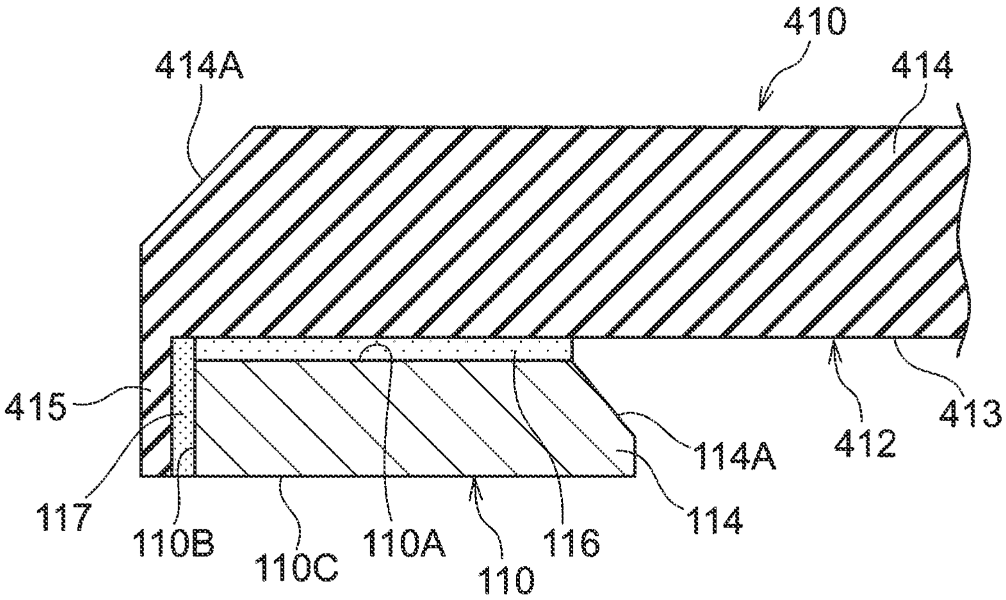
FIG. 14 is a cross-sectional view illustrating the downstream end portion of a mounting member according to a third embodiment in the traveling direction.

As illustrated in FIG. 14, the mounting member 410 includes a sheet member 412 and an attachment portion 110. The sheet member 412 includes a solid rubber layer 414. That is, the sheet member 412 is formed of a single layer. An end portion of the solid rubber layer 414 which is located on one end side in the circumferential direction (that is, on the downstream side in the rotation direction) has an inclined surface 414A where the thickness of the solid rubber layer 414 gradually decreases toward the one end side. The inclined surface 414A is formed on the opposite side to the attachment portion 110 of the solid rubber layer 414. For example, a corner portion of the sheet member 412 on the opposite side to the attachment portion 110 of the solid rubber layer 414 is cut to form the inclined surface 414A.

A first surface 110A of the attachment portion 110 is bonded to a reverse surface 413 of the sheet member 412 (that is, a reverse surface 413 of the solid rubber layer 414) with an adhesive 116. The sheet member 412 includes a turnaround portion 415 formed by making the solid rubber layer 414 turn around to a second surface 110B of the attachment portion 110. The turnaround portion 415 is bonded to the second surface 110B of the attachment portion 110 with an adhesive 117. Other configurations of the mounting member 410 are the same as those of the mounting member 90 according to the first embodiment.

Since the mounting member 410 has the same configuration as that of the mounting member 90 according to the first embodiment, the same operation and effect as those of the mounting member 90 can be obtained.

Fourth Embodiment

A mounting member 420 according to the fourth embodiment will be described next with reference to FIG. 15. The same components as those of the first to third embodiments described above are denoted by the same reference numerals, and a description thereof will be omitted.

Figure 15:
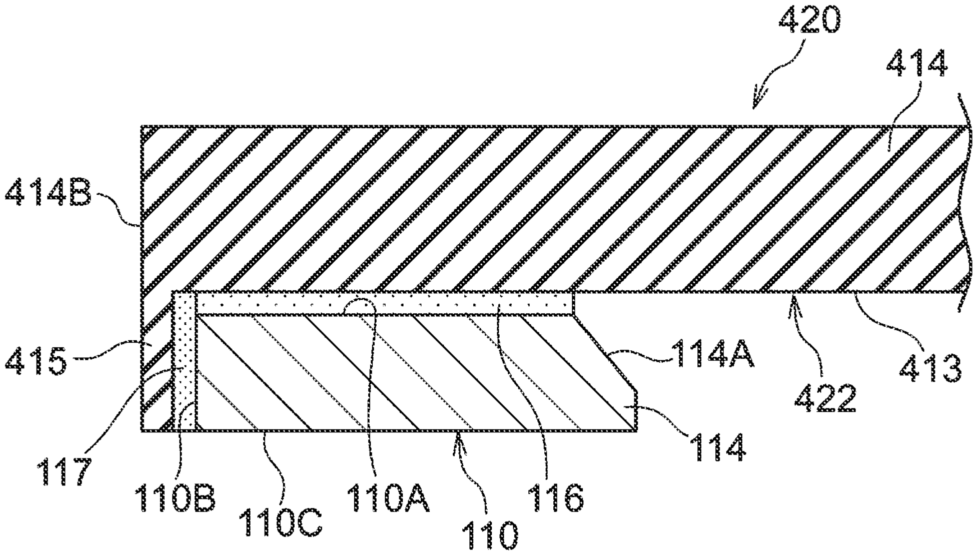
FIG. 15 is a cross-sectional view illustrating the downstream end portion of a mounting member according to a fourth embodiment in the traveling direction.

As illustrated in FIG. 15, the mounting member 420 includes a sheet member 422 and an attachment portion 110. The sheet member 422 includes a solid rubber layer 414. That is, the sheet member 422 is formed of a single layer. In the fourth embodiment, the shape of the solid rubber layer 414 is different from that of the sheet member 412 according to the third embodiment. One end side of the solid rubber layer 414 in the circumferential direction (that is, the downstream side in the rotation direction) has a rectangular shape. An end face 414B of the solid rubber layer 414 which is located on one end side in the circumferential direction (that is, on the downstream side in the rotation direction) is arranged along a second surface 110B of the attachment portion 110.

A first surface 110A of the attachment portion 110 is bonded to a reverse surface 413 of the sheet member 422 (that is, a reverse surface 413 of the solid rubber layer 414) with an adhesive 116. The sheet member 422 includes a turnaround portion 415 turning around the second surface 110B of the attachment portion 110 along the end face 414B of the solid rubber layer 414. The turnaround portion 415 is bonded to the second surface 110B of the attachment portion 110 with an adhesive 117. Other configurations of the mounting member 420 are the same as those of the mounting member 90 according to the first embodiment.

Since the mounting member 420 has the same configuration as that of the mounting member 90 according to the first embodiment, the same operation and effect as those of the mounting member 90 can be obtained.

Fifth Embodiment

A mounting member 430 according to the fifth embodiment will be described next with reference to FIG. 16. The same components as those of the first to fourth embodiments described above are denoted by the same reference numerals, and a description thereof will be omitted.

Figure 16:
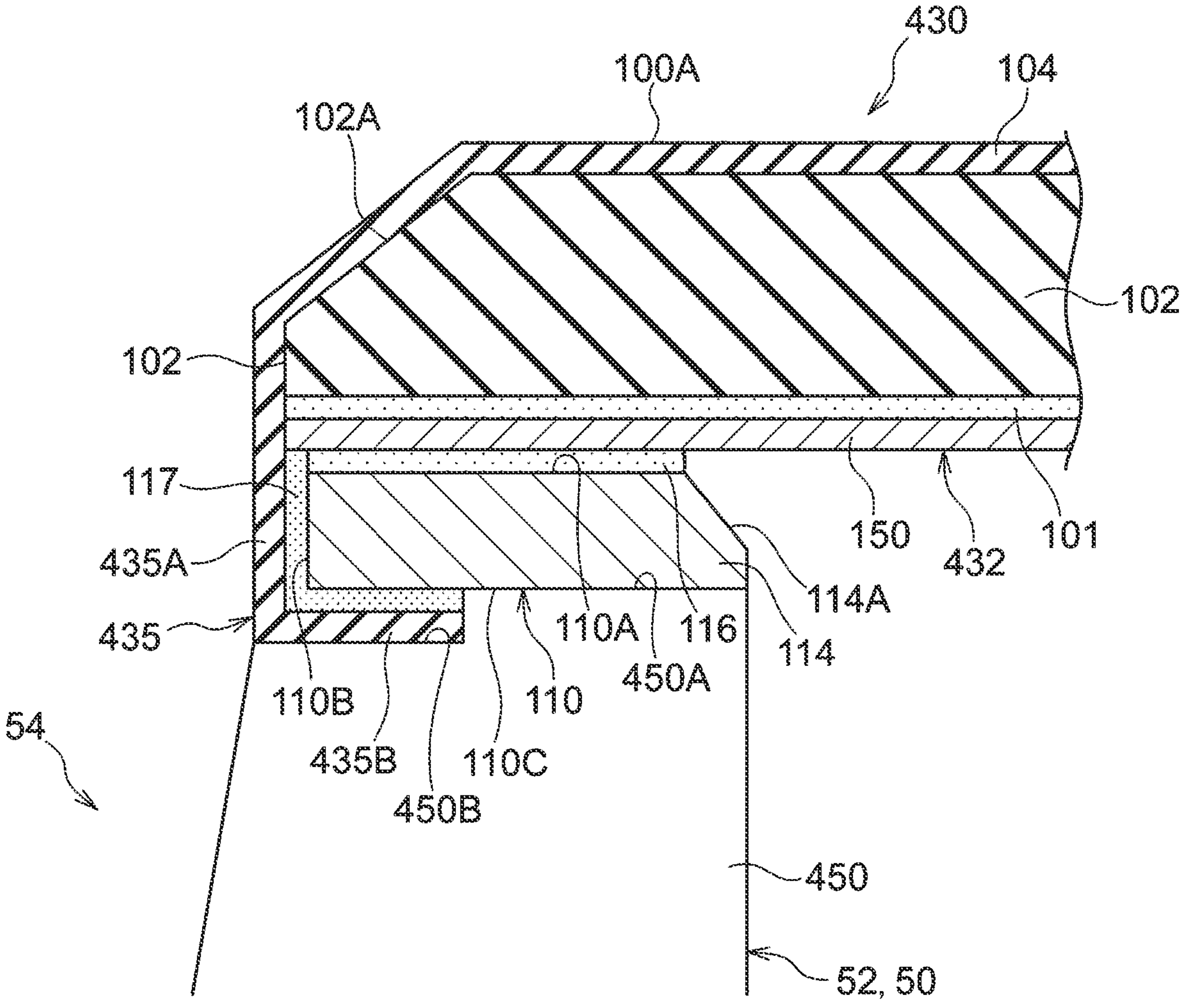
FIG. 16 is a cross-sectional view illustrating a state in which the downstream end portion of a mounting member according to a fifth embodiment in the traveling direction is attached to the transfer cylinder.

As illustrated in FIG. 16, the mounting member 430 includes a sheet member 432 and an attachment portion 110. The sheet member 432 includes a metal layer 150, a foam rubber layer 102, and a solid rubber layer 104.

The sheet member 432 includes a turnaround portion 435 formed by making a part of the sheet member 432 turn around from a second surface 110B of the attachment portion 110 toward a third surface 110C on the opposite side to the first surface 110A. In the fifth embodiment, the turnaround portion 435 is formed by the solid rubber layer 104 that is a portion of the sheet member 432. The turnaround portion 435 includes a first portion 435A that comes into contact with the second surface 110B of the attachment portion 110 and a second portion 435B that is bent from an end portion of the first portion 435A and comes into contact with the third surface 110C of the attachment portion 110. The turnaround portion 435 is bonded to the second surface 110B and the third surface 110C of the attachment portion 110 with an adhesive 117.

A base portion 450 as an example of an attachment-receiving portion provided on the cylinder body 52, is provided with a contact portion 450A that comes into contact with a third surface 110C of the attachment portion 110. Further, the base portion 450 is provided with a notched portion 450B recessed by the total thickness of the turnaround portion 435 of the sheet member 432 and the adhesive 117 at a position adjacent to the contact portion 450 A. The attachment portion 110 is fixed to the base portion 450 with an attachment screw (not illustrated) in a state where the third surface 110C of the attachment portion 110 of the mounting member 430 is in contact with the contact portion 450A of the base portion 450 and the turnaround portion 435 is in contact with the notched portion 450B. Other configurations of the mounting member 430 and the transfer cylinder 50 are similar to those of the mounting member 90 and the transfer cylinder 50 according to the first embodiment.

Since the mounting member 430 has the same configuration as that of the mounting member 90 according to the first embodiment, the same operation and effect as those of the mounting member 90 can be obtained. In addition, the following operations and effects can be obtained by the configuration different from the mounting member 90 according to the first embodiment.

In the mounting member 430 described above, the turnaround portion 435 turns from the second surface 110B of the attachment portion 110 to the third surface 110C on the opposite side to the first surface 110A, and the third surface 110C is bonded to the turnaround portion 435. Accordingly, in the mounting member 430, the sheet member 432 is less likely to peel off from the attachment portion 110 than when only the third surface 110C of the attachment portion 110 on the opposite side to the first surface 110A is bonded to the turnaround portion of the sheet member.

Further, the base portion 450 of the cylinder body 52 is provided with the notched portion 450B recessed by the thickness of the turnaround portion 435 of the sheet member 432 and the adhesive 117. Accordingly, in the transfer cylinder 50, the turnaround portion 435 of the sheet member 432 is prevented from floating from the base portion 450, as compared with the case where the contact surface of the base portion is a flat surface having a uniform height.

(Others)

Note that the present invention is not limited to the above embodiments and can be modified in design as appropriate without departing from the gist of the present invention.

In the first to fifth embodiments, the sheet member is bonded to the entire surface of the attachment portion 110 in the axial direction. However, in the present disclosure, the sheet member may be bonded to a part of the attachment portion 110 in the axial direction (for example, a plurality of portions of the attachment portion 110 in the axial direction). Further, although the sheet member includes the turnaround portion extending to the second surface 11B side of the attachment portion 110, the present disclosure is not limited to this configuration. For example, a recess recessed radially outward may be provided in one end portion 110A of the reverse surface 151 of the sheet member 100, the attachment portion 110 may be inserted into the recess, and the second surface 110B of the attachment portion 110 may be bonded to the downstream side portion (turnaround portion) of the recess in the rotation direction.

Although the foam rubber layer 102 and the solid rubber layer 104 are stacked on the outer peripheral surface of the metal layer 150 in the first, second, and fifth embodiments, the present disclosure is not limited to this configuration. The covering layer covering the metal layer 150 can be changed, and for example, a configuration in which only a solid rubber layer is stacked as a covering layer on the metal layer 150, and the solid rubber layer forms the turnaround portion may be adopted.

In the third and fourth embodiments, the sheet member is constituted by a single layer formed of the solid rubber layer 104, but the present disclosure is not limited to this configuration. For example, the sheet member may be formed of a single layer of foam rubber or may have a configuration in which only a foam rubber layer is stacked on a metal layer. In addition, for example, the sheet member may have a configuration in which only a solid rubber layer is stacked on a metal layer.

In the fifth embodiment, the turnaround portion 435 of the sheet member 432 is bonded to the second surface 110B and the third surface 110C of the attachment portion 110, but the present disclosure is not limited to this configuration. For example, the turnaround portion of the sheet member may be bonded to the third surface 110C without being bonded to the second surface 110B of the attachment portion 110.

Further, the cylinder body 52 may be formed in a substantially columnar shape instead of a substantially cylindrical shape. The cylinder member is not limited to the configuration applied to the transfer cylinder 50 and may be applied to, for example, a fixing cylinder that fixes a toner under pressure, a blanket cylinder used in offset printing, or the like. In the present embodiment, a toner image is taken as an example of an image and is formed by a dry electrophotographic method. However, the present invention is not limited to this. For example, the image may be a toner image formed by a wet electrophotographic method.

What is claimed is:

1. A mounting member to be mounted on a member that moves in a traveling direction, the mounting member comprising:

a rectangular sheet member; and an attachment portion having a first surface bonded to one end portion of a reverse surface of a downstream side portion of the sheet member in the traveling direction, the attachment portion being detachably attached to an attachment-receiving portion comprising a contact surface, and the attachment portion having a surface facing a direction different from a direction of the first surface bonded to the sheet member, wherein the attachment portion is a plate-like metal member.

2. The mounting member according to claim 1, wherein a part of the sheet member includes a turnaround portion intersecting with the first surface of the attachment portion and turning around to a second surface facing the downstream side of the sheet member in the traveling direction, the turnaround portion being bonded to the second surface.

3. The mounting member according to claim 2, wherein the turnaround portion turns around from the second surface of the attachment portion to a third surface on an opposite side to the first surface, and the third surface is bonded to the turnaround portion.

4. The mounting member according to claim 1, wherein the sheet member is more easily elastically deformed than the attachment-receiving portion.

5. The mounting member according to claim 4, wherein the sheet member has a plurality of layers.

6. The mounting member according to claim 5, wherein the sheet member has one of the plurality of layers which is bonded to a surface facing a direction different from a direction of the first surface of the attachment portion.

7. The mounting member according to claim 6, wherein the sheet member includes a foam rubber layer, and the one layer harder than the foam rubber layer is bonded to a surface facing a direction different from a direction of the first surface of the attachment portion.

8. A cylinder member comprising a cylinder body having a substantially circular cross-section, the cylinder body including a recessed portion formed along an axial direction and configured to rotate in a circumferential direction and to make an opening edge portion of the recessed portion on an upstream side in a rotation direction abut against another member by rotation and the mounting member defined in claim 1 which is wound around an outer peripheral surface of the cylinder body except for the recessed portion, wherein the attachment-receiving portion is provided on a portion of an outer peripheral surface of the cylinder body which is located on the upstream side of the recessed portion in the rotation direction, and the attachment portion is attached to the attachment-receiving portion in a state where the attachment portion is disposed outside the attachment-receiving portion in a radial direction.

9. The cylinder member according to claim 8, wherein both end portions of the attachment portion of the cylinder body in the axial direction are attached to the attachment-receiving portion by fixing a fixture from the radial direction of the attachment-receiving portion.

10. An image forming apparatus comprising:

the cylinder member defined in claim 9 which conveys a recording medium; and a transfer member, comprising a counter roller, that comes into contact with the cylinder member through an intermediate transfer body, comprising a transfer belt, and transfers an image formed on the intermediate transfer member to the recording medium conveyed by the cylinder member.

11. An image forming apparatus comprising:

a cylinder member which conveys a recording medium; and a transfer member, comprising a counter roller, that comes into contact with the cylinder member through an intermediate transfer body, comprising a transfer belt, and transfers an image formed on the intermediate transfer member to the recording medium conveyed by the cylinder member, wherein the cylinder member, comprises:

a cylinder body, having a substantially circular cross-section, the cylinder body including a recessed portion formed along an axial direction and configured to rotate in a circumferential direction and to make an opening edge portion of the recessed portion on an upstream side in a rotation direction abut against another member by rotation; and a mounting member which is wound around an outer peripheral surface of the cylinder body except for the recessed portion, wherein the mounting member comprises:

a rectangular sheet member; and an attachment portion having a first surface bonded to one end portion of a reverse surface of a downstream side portion of the sheet member in the traveling direction, the attachment portion being detachably attached to an attachment-receiving portion comprising a contact surface, and the attachment portion having a surface facing a direction different from a direction of the first surface and bonded to the sheet member, wherein the attachment-receiving portion is provided on a portion of an outer peripheral surface of the cylinder body which is located on the upstream side of the recessed portion in the rotation direction, and the attachment portion is attached to the attachment-receiving portion in a state where the attachment portion is disposed outside the attachment-receiving portion in a radial direction.

* * * * *